US008582566B2

(12) United States Patent
Bae et al.

(10) Patent No.: US 8,582,566 B2
(45) Date of Patent: Nov. 12, 2013

(54) METHOD AND SYSTEM OF FORWARDING CAPABILITY INFORMATION OF USER EQUIPMENT IN INTERNET PROTOCOL MULTIMEDIA SUBSYSTEM NETWORK

(75) Inventors: Eun-Hui Bae, Seoul (KR); O-Sok Song, Suwon-si (KR); Sung-Ho Choi, Suwon-si (KR); Tae-Sun Yeoum, Seoul (KR); Han-Na Lim, Siheung-si (KR)

(73) Assignee: Samsung Electronics Co., Ltd (KR)

( * ) Notice: Subject to any disclaimer, the term of this patent is extended or adjusted under 35 U.S.C. 154(b) by 755 days.

(21) Appl. No.: 11/790,000

(22) Filed: Apr. 26, 2007

(65) Prior Publication Data
US 2007/0259651 A1 Nov. 8, 2007

(30) Foreign Application Priority Data

Apr. 26, 2006 (KR) .................. 10-2006-0037870
Apr. 27, 2006 (KR) .................. 10-2006-0038427

(51) Int. Cl.
*H04L 12/66* (2006.01)
(52) U.S. Cl.
USPC ............... 370/353; 370/351; 370/352
(58) Field of Classification Search
None
See application file for complete search history.

(56) References Cited

U.S. PATENT DOCUMENTS

| 2002/0110104 | A1 | 8/2002 | Surdila et al. | |
|---|---|---|---|---|
| 2004/0028037 | A1* | 2/2004 | Rasanen et al. | 370/354 |
| 2005/0058125 | A1 | 3/2005 | Mutikainen et al. | |
| 2006/0047840 | A1 | 3/2006 | Postmus | |
| 2006/0092925 | A1* | 5/2006 | Svensson et al. | 370/352 |
| 2006/0206504 | A1* | 9/2006 | Cai et al. | 707/100 |
| 2006/0229093 | A1* | 10/2006 | Bhutiani et al. | 455/518 |
| 2007/0002840 | A1* | 1/2007 | Song et al. | 370/352 |
| 2007/0121608 | A1* | 5/2007 | Gu et al. | 370/356 |
| 2007/0217354 | A1* | 9/2007 | Buckley | 370/328 |
| 2008/0316998 | A1* | 12/2008 | Procopio et al. | 370/352 |
| 2010/0070632 | A1* | 3/2010 | Song et al. | 709/227 |

FOREIGN PATENT DOCUMENTS

| KR | 1020040090023 | 10/2004 |
|---|---|---|
| KR | 1020050066480 | 6/2005 |
| RU | 2005-104119 | 7/2005 |

(Continued)

OTHER PUBLICATIONS

3GPP TS 23.279 "Combining Circuit Switched (CS) and IP Multimedia Subsystem (IMS) services; Stage 2 (Release 7)". 3rd Generation Partnership Project. Version 7.2.0 : Mar. 2006.*

(Continued)

*Primary Examiner* — Jae Y Lee
(74) *Attorney, Agent, or Firm* — The Farrell Law Firm, P.C.

(57) ABSTRACT

Disclosed is a method and system for mutually exchanging capability information of UEs for communication between a Circuit-Switched (CS) and IMS services (CSI) UE, which can use a CS call for voice communication while using an IMS session for PS service, and an IMS UE which uses an IMS session for both voice communication and PS service. A MGCF performs interworking of capability information between a CS message and an IMS message so that the IMS UE can process UE capability information through an IMS session request/response. When a call request message containing no capability information is created from a UE not supporting capability exchange, a CSI AS transfers the call request message to a peer UE after inserting estimable capability information of the UE into the call request message, and stores capability information of the counterpart UE for the UE.

32 Claims, 12 Drawing Sheets

(56) References Cited

FOREIGN PATENT DOCUMENTS

| RU | 2005-114023 | | 11/2005 | | |
|---|---|---|---|---|---|
| WO | WO 01/84790 | | 11/2001 | | |
| WO | WO 2004/008178 | | 1/2004 | | |
| WO | WO 2004/034718 | | 4/2004 | | |
| WO | WO 2005/015870 | | 2/2005 | | |
| WO | WO 2005/120003 | | 12/2005 | | |
| WO | WO 2006/024987 | | 3/2006 | | |
| WO | WO 2006/034658 | * | 4/2006 | ............... | H04Q 7/20 |

OTHER PUBLICATIONS

RFC 2327 "SDP: Session Description Protocol" IETF Network Working Group. Apr. 1998 <http://tools.ietf.org/html/rfc2327>.*
3GPP TS 24.279 "Combining Circuit Switched (CS) and IP Multimedia Subsystem (IMS) services; Stage 3 (Release 7)" V7.0.0 Mar. 2006. pp. 1-56.*
3GPP, "3GPP TS 24.279 v7.0.0," Mar. 2006, 3GPP.*
U.S. Appl. No. 60/692,665.*
3GPP TS 24.279 v7.0.0, Mar. 2006, 3GPP.*

* cited by examiner

METHOD AND SYSTEM OF FORWARDING CAPABILITY INFORMATION OF USER EQUIPMENT IN INTERNET PROTOCOL MULTIMEDIA SUBSYSTEM NETWORK

PRIORITY

This application claims priority under 35 U.S.C. §119(a) to Korean Patent Applications entitled "Method And System Of Forwarding Capability Information Of User Equipment In Internet Protocol Multimedia Subsystem Network" filed with the Korean Intellectual Property Office on Apr. 26, 2006 and assigned Serial No. 2006-37870; and filed Apr. 27, 2006 and assigned Serial No. 2006-38427, the contents of which are incorporated herein by reference.

BACKGROUND OF THE INVENTION

1. Field of the Invention

The present invention relates to the interworkings of a combined Circuit-Switched call and IMS services (CSI) including a Circuit-Switched (CS) and an Internet Protocol Multimedia Subsystem (IMS) session combined together, and in particular, to a method and system for communication between a user equipment (CSI UE) which can simultaneously support the CS call and IMS session, and a User Equipment (IMS UE) which cannot support the CSI and can support only the IMS session.

2. Description of the Related Art

A Circuit-Switched (CS) scheme is used for typical voice service. The CS scheme forms a CS-based fixed communication path between two users. In comparison, an Internet Protocol Multimedia Subsystem (IMS) uses a Packet-Switched-based (PS-based) variable communication path based on an Internet Protocol (IP), thus increasing transmission efficiency and ensuring stability. Such an IMS can support a connection to a session in which a plurality of users participate, as well as one-to-one communication. According to the CS scheme, a message is transmitted through a CS call. In comparison, according to the IMS scheme, a message is transmitted through an IMS session.

Service enabling a UE to simultaneously use the CS call and IMS session is called "CSI". The CSI uses a CS call for voice transmission, that is, for voice communication, and simultaneously uses an IMS session for an enhanced Packet-Switched (PS) service including a messaging or file transmission. A UE supporting the CSI is called a "CSI UE". The CSI UE can use a CS call for realtime voice communication while using an IMS session for non-realtime PS services such as messaging. While the CSI takes voice communication into consideration as a service using a CS call, the CSI enables a CS call to be used for image communication as well as voice communication when a CS network supports the image communication.

An IMS network includes a Message Gateway Control Function (MGCF) which is an IMS entity taking charge of interworking between a CS-call-related message (CS message) and an IMS-session-related message (IMS message). The MGCF provides a function of converting a Session Initiation Protocol (SIP) header and Session Description Protocol (SDP) parameters, which are basically included in a message, into an Integrated Services digital Network (ISDN) User Part (ISUP)/Bearer Independent Call Control (BICC) message, and a function of converting an ISUP/BICC into a SIP header and SDP parameters. According to the CSI, a CSI UE attempts capability exchange with a peer UE by transmitting a CS-call setup message including the capability information of the CSI UE. In this case, the peer UE may be another CSI UE, an IMS-only UE which cannot support the CSI and can support only the IMS session, a Voice-Call-Continuity (VCC) UE which supports VCC service, or a UE which can support both the CSI and VCC service. Through the capability exchange, it is possible to determine if each UE can use the CS service for a voice call, provide the IMS service for data transmission, or provide both the CS service and IMS service.

When a call setup is generated between a CSI-capable UE (i.e., CSI UE) and a CSI-incapable UE (i.e., IMS terminal), the CSI UE transmits a CS-call setup message including its own capability information to the IMS UE. However, since a conventional MGCF has no method of converting the capability information transmitted by the CSI UE into a SIP message, the MGCF cannot transfer the capability information transmitted by the CSI UE to the IMS UE. As a result, it is impossible to perform capability exchange through a CS message between a CSI UE and an IMS UE, resulting in no direct IMS connection between the two UEs requesting an IMS connection setup although both the UEs can support a connection to the IMS.

SUMMARY OF THE INVENTION

Accordingly, the present invention has been made to solve the above-mentioned problems occurring in the prior art, and one aspect of the present invention is to provide a method and system for processing capability information between User Equipments (UEs) in an Internet Protocol Multimedia Subsystem (IMS) network.

According to another aspect of the present invention, there is provided a method and system for interworking between capability information of a CSI UE and an IMS UE in a Media Gateway Control Function (MGCF), which is a network entity taking charge of interworking for communication between the two UEs.

According to another aspect of the present invention, there is provided a method and system for processing capability information of an IMS UE and capability information of a CSI UE in the IMS UE upon communication between the two UEs.

According to yet another aspect of the present invention, there is provided a method and system for enabling a SIP Application Server (AS), which is a network entity taking charge of interworking for communication between a CSI UE and an IMS UE, to add, delete, and correct capability information of each UE.

According to another aspect of the present invention, there is provided a method and system for allowing a VCC AS, which is a network entity taking charge of call anchoring and domain transfer for a VCC-capable UE, to identify information about a domain from which a received SIP message is transferred, and to insert the identified domain into a SIP message.

According to one aspect of the present invention, there is provided a method for transferring capability information of a User Equipment (UE) in an Internet Protocol Multimedia Subsystem (IMS) network. The method includes receiving a first Session Initiation Protocol (SIP) message which has been transmitted by a calling-party UE; acquiring the capability information of the calling-party UE from the first SIP message; creating a second SIP message containing the capability information using the first SIP message; and transmitting the second SIP message containing the capability information to the called-party UE through a Media Gateway Control Function (MGCF).

According to another aspect of the present invention, there is provided a system for transferring capability information of a User Equipment (UE) in an Internet Protocol Multimedia Subsystem (IMS) network. The system includes an Application Server (AS) receiving a first Session Initiation Protocol (SIP) message which has been transmitted by a calling-party UE, acquiring the capability information of the calling-party UE from the first SIP message, and creating a second SIP message containing the capability information using the first SIP message; and a Media Gateway Control Function (MGCF) of the terminating-side network, the MGCF receiving the second SIP message containing the capability information, and transferring the received second SIP message to the called-party UE.

According to yet another aspect of the present invention, there is provided a method for transferring capability information of a User Equipment (UE) in an Internet Protocol Multimedia Subsystem (IMS) network. The method includes transmitting; a Circuit-Switched (CS) call request message containing a capability information of a calling-party UE; receiving the CS call request message; converting the CS call request message into a Session Initiation Protocol (SIP) message containing the capability information of the calling-party UE; and transmitting the SIP message containing the capability information of the calling-party UE to the called-party UE.

According to still another aspect of the present invention, there is provided a method for transferring capability information of a User Equipment (UE) in an Internet Protocol Multimedia Subsystem (IMS) network. The method includes receiving a Session Initiation Protocol (SIP) message containing a capability information of the calling-party UE; converting the SIP message into a Circuit-Switched (CS) call request message containing the capability information of the calling-party UE; and transmitting the CS call request message containing the capability information of the calling-party UE to the called-party UE.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE PREFERRED EMBODIMENTS

Exemplary embodiments of the present invention will be described in detail with reference to the accompanying drawings. In the following description of the present invention, a detailed description of known functions and configurations incorporated herein is omitted to avoid making the subject matter of the present invention unclear. In addition, the terminology used in the description is defined in consideration of the function of corresponding components used in the present invention and may be varied according to users, operator's intention, or practices. Accordingly, the definition must be interpreted based on the overall content disclosed in the description.

Before description of the exemplary embodiments of the present invention, the construction of an Internet Protocol Multimedia Subsystem (IMS) network to which the present invention can be applied will be described in brief.

Figure 1:
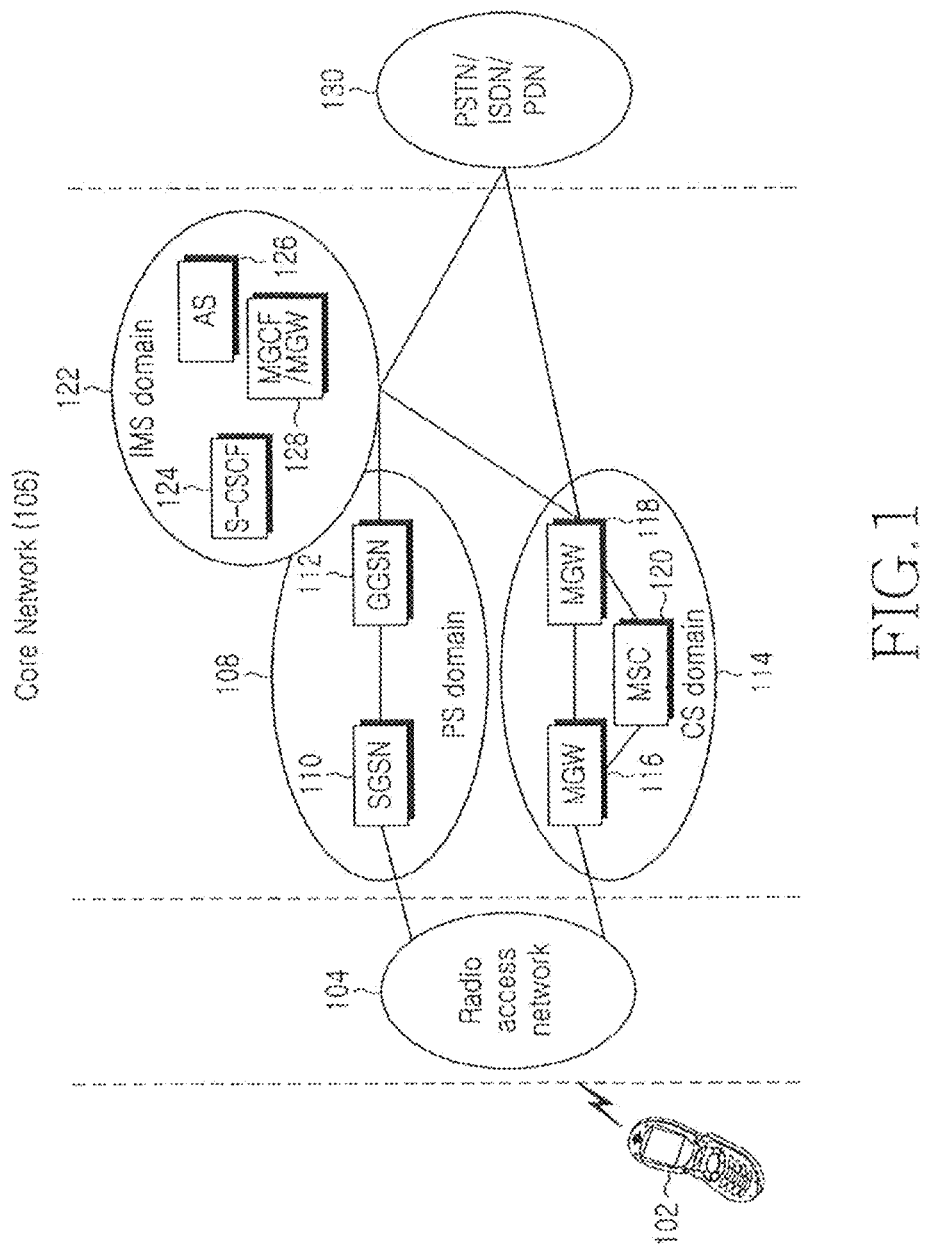
FIG. 1 is a block diagram illustrating the construction of a mobile communication network supporting CSI.

FIG. 1 is a block diagram illustrating the construction of a mobile communication network supporting CSI. Although the following description will be made with respect to a Universal Mobile Telecommunication Service (UMTS) mobile communication network based on Global System for Mobile Communications (GSM) and General Packet Radio Services (GPRS), it should be noted that the scope of the present invention is not limited to such a specified technology or terms.

In FIG. 1, a mobile communication network supporting CSI includes a Radio Access Network (RAN) 104 and a Core Network (CN) 106. The RAN 104 enables a User Equipment (UE) 102 to access the CN 106. The construction of the RAN 104 according to used radio access technologies and so on is generally known in the art, so a detailed description thereof will be omitted.

The CN 106 includes a CS domain 114, a Packet-Switched (PS) domain 108 and an IMS domain 122. The CS domain 114 contains network entities supporting a CS call, which include a Mobile Switching Center (MSC) 120 and Media Gateways (MGWs) 116 and 118 as representative network entities. The MSC 120 processes signals originated/terminated from/to node Bs, which are contained in the RAN 104, and functions as a central controller which performs a control operation so that the node Bs can efficiently operate. The MGWs 116 and 118 support bearer traffic and control traffic of the CS domain 114.

The PS domain 108 supports packet-based service, and includes a Serving GPRS Support Node (SGSN) 110 and a Gateway GPRS Support Node (GGSN) 112. The SGSN 110 manages information about locations of UEs, and performs a security-related function, an access control, etc. The GGSN 112 is a component of a GPRS network, which functions as a radio gateway between the SGSN 110 and an external network 130 such as a Packet Data Network (PDN). The UE 102 can access the PDN 130 by using the GGSN 112.

The IMS domain 122 contains network entities supporting an IMS session. Particularly, the IMS domain 122 includes a Serving-Call Session Control Function (S-CSCF) 124, an Application Server (AS) 126 and a Media Gateway Control Function/Media Gateway (MGCF/MGW) 128. The S-CSCF 124 establishes an IMS session, and functions to process an IMS-related Session Initiation Protocol (SIP) message received from the UE 102. In order to provide service as required by the UE 102, the S-CSCF 124 transfers the SIP message entities contained in the IMS domain 122 so that a session can be completed.

The AS 126 is an entity for providing the user with an application, such as an email, a Push To Talk over Cellular (PoC), etc. For example, an AS (CSI AS) supporting CSI acquires a SIP INVITE message, which is a request message for a multimedia session or Voice over IP (VoIP) call to be transferred to the user, and analyzes a requested media type. Then the CSI AS separates media information included in the SIP INVITE message into voice media information and packet media information, transfers the voice media information to the CS domain, and transfers the packet media information to the IMS domain.

The MGCF/MGW 128 is a network entity for enabling communication between an IMS user and a CS user. The MGCF/MGW 128 contains an MGCF, which is a gateway taking charge of signaling conversion for interworking between an IMS network and an existing network (e.g., a Public Switched Telephone Network (PSTN)), and an IMS-MGW for media conversion. Although it is not shown, the MGCF/MGW 128 may further contain a Breakout Gateway Control Function (BGCF), which is a network entity of selecting an optimal MGCF corresponding to a contact point connected with the CS domain in consideration of routing optimization for a CS terminating call. The BGCF may be included in the MGCF/MGW 128.

In addition to the aforementioned entities, each domain may additionally include one or more different entities, and the different entities may play a part in CSI.

When a CSI UE transmits a CS-call setup message to a CSI-incapable UE (i.e., an IMS UE) in a network having the aforementioned construction, an MGCF located in a terminating-side network adds the capability information of the CSI UE, which is included in the CS-call setup message, to a SIP INVITE message, and transfers the SIP INVITE message to the IMS UE. When an IMS UE, which cannot perform the CSI, adds its own capability information to a SIP INVITE message and transmits the SIP INVITE message, an MGCF located in a terminating-side network, in which a called-party CSI UE is located, inserts the capability information contained in the SIP INVITE message into a user-user information field in a CS-call setup message, and then transmits the CS-call setup message to the CSI UE. Accordingly, the MGCF can process the capability information of each UE, and the IMS UE can acquire the capability information of a peer UE.

According to an exemplary embodiment of the present invention, there is provided a scheme for enabling a CSI UE and a CSI-incapable UE to exchange, through the interworking function of an MGCF, mutual capability information, that is, not only information (e.g., the simultaneous CS and PS capability) about whether a UE can simultaneously access the CS domain and PS domain, an ID (e.g., Personal ME identifier) for identifying a specific UE belonging to a user, version information (e.g., UE capability version) about the current capability of a UE, and information about an IMS registration state, but also various terminal-related or UE-related capability information which can usefully be used for communication between terminals, so that an IMS session setup can be achieved between users by utilizing the capability information. In addition, according to another exemplary embodiment of the present invention, there is provided a scheme of expanding the function of an IMS UE such that the IMS UE adds its own capability information to an INVITE message, and receives and analyzes a message including capability information.

Figure 2:
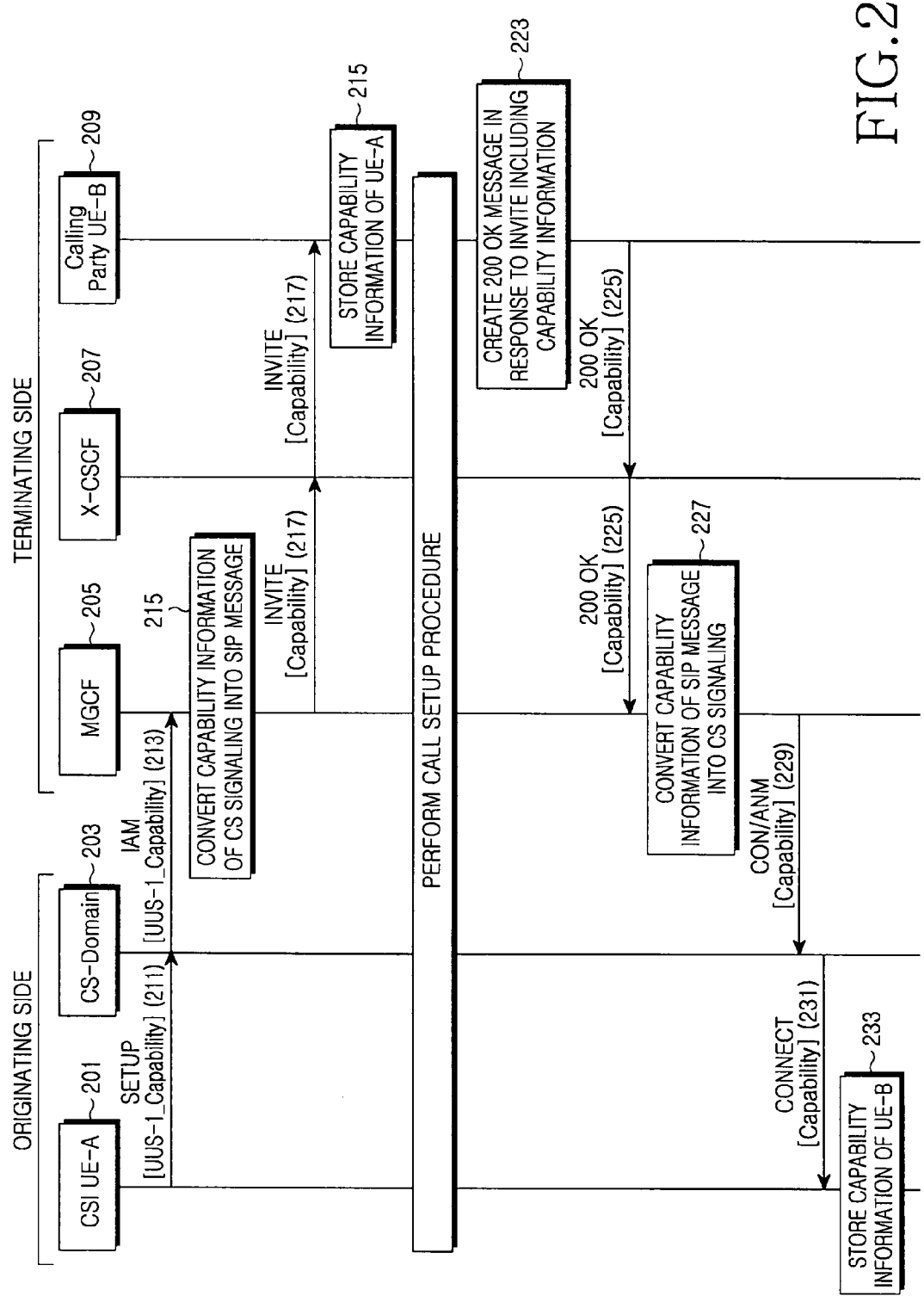
FIG. 2 is a flowchart illustrating a message flow when a CSI UE requests a CS-call setup to an IMS UE according to an embodiment of the present invention.

FIG. 2 is a flowchart illustrating a message flow when a CSI UE requests a CS-call setup to a CSI-incapable UE according to an embodiment of the present invention. In FIG. 2, an IMS UE is exemplified as the CSI-incapable UE.

When UE-A 201, which is a CSI UE, intends to set a CS voice call, the UE-A 201 creates a CS-call setup message that includes capability information of the UE-A 201 in a User-User Signaling (UUS) field, and transmits the CS-call setup message to a network entity, e.g., an MSC, (CS network entity) of a CN domain in step 211. In this case, the capability information may include radio capability information of the UE, simultaneous access capability to the CS domain and PS domain, identification information about the UE, version information about UE capability, IMS registration information, etc. In addition, the capability information may include various capability-related information which can be exchanged between terminals. The radio capability represents a physical capability, such as a frequency channel which the UE can access, and additionally may represent information about whether or not the UE can access the PS domain and/or CS domain.

Table 1 shows a format of capability information which is transferred through a UUS information field representing user-user information in a CS-call setup message.

TABLE 1

User-User IE = [(Protocol ID = 3GPP capability exchange protocol),
    (Capability Identifier = 0, Environment = 1),
    (Capability Identifier = 1, Personal ME Identifier = 0007),
    (Capability Identifier = 2, UE capability version = 1),
    (Capability Identifier = 3, IMS registration = 1).

A network entity 203 of the CS domain, in which the UE-A 201 is located, converts the CS-call setup message transmitted from the UE-A 201 into an ISUP/BICC Initial Address Message (ISUP/BICC IAM), and transfers the ISUP/BICC IAM to an MGCF 205, which is a CSI interworking entity in the IMS domain where a called-party CSI-incapable UE-B 209 is located in step 213. When having received the ISUP/BICC IAM, the MGCF 205 performs an interworking function to convert a CS-call setup message extracted from the ISUP/BICC IAM into a SIP protocol-based message, particularly into a SIP INVITE message in step 215. The procedure of converting a CS-call setup message into a SIP INVITE message, except for a process required for converting capability information, is generally known in the art and has no direct relation to the present invention, so a detailed description thereof will be omitted.

In detail, in order to perform an interworking operation for the capability information of the UE-A 201, the MGCF 205 configures a specific SIP header in a predetermined scheme by analyzing the pattern of information fields included in the IAM, and also creates a SIP message by analyzing and processing a UUS field. In other words, when having received an IAM, the MGCF 205 analyzes the UUS information field included in the IAM, extracts the capability information of the UE-A 201 when the UUS information field contains the capability information of the UE-A 201, and configures a SIP INVITE message as described later.

In this case, in order to insert the capability information of the UE-A 201 into a SIP message such as an INVITE message, it is possible to employ an expanded definition that causes the MGCF 205 to use different patterns depending on types of capability information. However, in this case, whenever the kinds of capability information increases in number, the function of the MGCF 205 to define a new pattern must be updated, which is a disadvantage in that extensibility is degraded. For this reason, the prevent invention proposes various solutions for enabling the MGCF 205 to configure the capability information of the UE-A 201 in the SIP INVITE message. According to a solution described later, the MGCF 205 converts capability information, which has been included in a UUS information field, into an appropriate format. Conversely, the MGCF 205 also has a function of inserting capability information, which has been included in a SIP message, into a UUS information field of a CS signaling message in an appropriate format. Disclosed are four schemes for the MGCF 205 to encode capability information included in a CS-call setup message so that the capability information can be included in a SIP INVITE message. A first scheme is to add a supplementary feature tag representing the capability information to the SIP header of a SIP message, a second scheme is to insert the capability information to the message body of a SIP message by using an Extensible Markup Language (XML) format, a third scheme is to add the capability information to the message body of a SIP message by using a text format, and a fourth scheme is to add the capability information to the message body of a SIP message through the user of a binary format.

The four schemes for encoding the capability information so that the capability information can be included in a SIP INVITE message will now be described in detail.

According to the first scheme, when capability information of a UE is represented by a feature tag within a SIP header, each feature value representing capability information is defined within a range stipulated in a relevant standard, e.g., $3^{rd}$ Generation Partnership Project (3GPP). For example, identifier information is defined as a feature value of such a form as "PMI (Personal ME (Mobile Equipment) Identifier)= XXXX, and UE capability information is defined as a feature value of such a form as "UCV (UE Capability Version)= XX," in which each X represents a hexadecimal value. In order to represent whether or not it is possible to simultaneously access the CS domain and PS domain, an existing feature value, such as "+g.3gpp.cs-voice" or "+g.3gpp.cs-video," defined in 3GPP, may be utilized, or a separate feature tag representing PS domain availability may be used. Also, in order to represent an IMS registration state as UE capability information, another separate feature tag may be used. A format and the form of a feature tag, which represent capability information, in a SIP header is based on a format defined in a relevant standard. A contact header, a user-agent header, a server header and so on may be used as a SIP header including a feature tag as described above.

The second scheme is to add capability information to the message body of a SIP message by using an XML format. Table 2 below shows an example in which capability information of a CSI UE is encoded into an XML format and the encoded capability information is inserted into the message body of a SIP INVITE message. The discriminators of the XML in Table 2 are shown as an example only, so detailed contents thereof may be determined by a system operator.

TABLE 2

INVITE sip:14084955072@sc1.samsung.com SIP/2.0
Via: SIP/2.0/UDP sc10.samsung.com
From: sip:14085655675@sc10.samsung.com
To: sip:14084955072@sc1.samsung.com
Call-ID: 1231999021712095500999@sc12.samsung.com
CSeq: 1234 INVITE
Contact: <sip:14085655675@sc10.samsung.com>
Content-Length: 358
Content-Type: multipart/mixed; boundary=unique-boundary-1

TABLE 2-continued

MIME-Version: 1.0
--unique-boundary-1
Content-Type: application/sdp; charset=ISO-10646
- omitted -
--unique-boundary-1
Content-type: application/xml
<?xml version="1.0" encoding="UTF-8"?>
<testDatatype
xmlns:xsi="http://www.w3.org/2001/XMLSchema-instance">
<3GPPCapabilityExchange>
    <Capability>
        <CapabilityID>1</CapabilityID>
        <CapabilityName>"Environment"</CapabilityName>
        <TerminalCapability>1</TerminalCapability>
        <RadioEnvironment>1</RadioEnvironment>
    </Capability>
    <Capability>
        <CapabilityID>2</CapabilityID>
        <CapabilityName>"Personal ME Identifier"</CapabilityName>
        <PMI>0007</PMI>
    </Capability>
    <Capability>
        <CapabilityID>3</CapabilityID>
        <CapabilityName>"UE Capability Version"</CapabilityName>
        <UCV>01</UCV>
    </Capability>
    <Capability>
        <CapabilityID>4</CapabilityID>
        <CapabilityName>"IMS Registration Status"</CapabilityName>
        <IMSStatus>1</IMSStatus>
    </Capability>
</3GPPCapabilityExchange>
--unique-boundary-1--

The correct encoding for each capability information field used in Table 2 is predetermined. Also, the definition of each capability information field is predetermined between a UE and a network, and has a value which can be recognized by any entity of the UE and network capable of performing the function proposed by the present invention.

The third scheme is to encode capability information into a text format and to insert the encoded capability information into the message body of a SIP message. An example of capability information encoded into a text format is shown in Table 3.

TABLE 3

INVITE sip:14084955072@sc1.samsung.com SIP/2.0
Via: SIP/2.0/UDP sc10.samsung.com
From: sip:14085655675@sc10.samsung.com
To: sip:14084955072@sc1.samsung.com
Call-ID: 1231999021712095500999@sc12.samsung.com
CSeq: 1234 INVITE
Contact: <sip:14085655675@sc10.samsung.com>
Content-Length: 358
Content-Type: multipart/mixed; boundary=unique-boundary-1
MIME-Version: 1.0
--unique-boundary-1
Content-Type: application/sdp; charset=ISO-10646
- omitted -
--unique-boundary-1
Content-type: text/plain
  Environment = PS capable | CS capable | CS Capable, PS Capable
  Personal ME Identifier = PMI-0007
  UE Capability Version = UCV-01
--unique-boundary-1--

Table 3 shows an example of discriminators available in an XML, in which detailed contents and definitions are based on rules promised between a UE and a network.

The fourth scheme is to encode capability information into a binary format and to insert the encoded capability information into the message body of a SIP message. An example of capability information encoded into a binary format is shown in Table 4 below.

TABLE 4

```
INVITE sip:14084955072@sc1.samsung.com SIP/2.0
Via: SIP/2.0/UDP sc10.samsung.com
From: sip:14085655675@sc10.samsung.com
To: sip:14084955072@sc1.samsung.com
Call-ID: 1231999021712095500999@sc12.samsung.com
CSeq: 1234 INVITE
Contact: <sip:14085655675@sc10.samsung.com>
Content-Length: 358
Content-Type: multipart/mixed; boundary=unique-boundary-1
MIME-Version: 1.0
--unique-boundary-1
Content-Type: application/sdp; charset=ISO-10646
- omitted -
--unique-boundary-1
Content-type: text/plain
base=etsi141 //identifier representing binary encoding
Content-Disposition: signal; handling=optional
0100110000010100010110001111111
1100000101011010110101100110
110010010101101110110010000111
 011111111101110101101011100100
--unique-boundary-1--
```

When the MGCF 205 has converted the ISUP/BICC IAM into a SIP INVITE message, the SIP INVITE message is transferred to the UE-B 209 via a network entity 207 (which is represented by "X-CSCF," in which "X-" may be "S-" or "P-") of the IMS domain which the UE-B 209 is accessing in step 217. The UE-B 209 has a function of extracting capability information included in a SIP INVITE message and a function of creating a request or response message including its own capability information. The UE-B 209 extracts and stores the capability information of the UE-A 201, which is included in the SIP INVITE message in step 219. Thereafter, a call setup procedure is performed through the exchange of supplementary messages between the UE-A 201 and UE-B 209 in step 221.

The UE-B 209, which is a CSI-incapable IMS UE, encodes and inserts its own capability information into a 183 session progress message or SIP OK message, which is a SIP response to the SIP INVITE message, by using one of the four schemes in step 223. The SIP 183 progress message or SIP 200 OK message, which includes the capability information of the UE-B 209, is transferred to the MGCF 205 through the network entity 207 of the IMS domain to which the UE-B 209 belongs in step 225.

The MGCF 205 performs an interworking function to convert the SIP 183/200 OK message into an ISUP/BICC connection/answer message (ISUP/BICC CON/ANM) in step 227. In this case, the MGCF 205 encodes and inserts the capability information included in the SIP 183/200 OK message, which has been transmitted from the UE-B 209 which is a CSI-incapable IMS UE, into user-user information of the ISUP/BICC CON/ANM.

An ISUP/BICC CON or ACM (Address Complete Message)/ANM, which is a CS response message including user-user information with the encoded capability information, is transferred to the CS network entity 203 of the UE-A 201 in step 229. The CS network entity 203 converts the ISUP/BICC CON or ACM/ANM into a Call Control (CC) CONNECT message, and transfers the CC CONNECT message to the UE-A 201 (step 231). The user-user information of the CC CONNECT message received by the UE-A 201 contains the capability information of the UE-B 209. The UE-A 201 stores the capability information of the UE-B 209, thereby identifying the capability information of the UE-B 209, and determining through the capability information that the UE-A 201 can form an IMS access to the UE-B 209 in step 233.

Figure 3A:
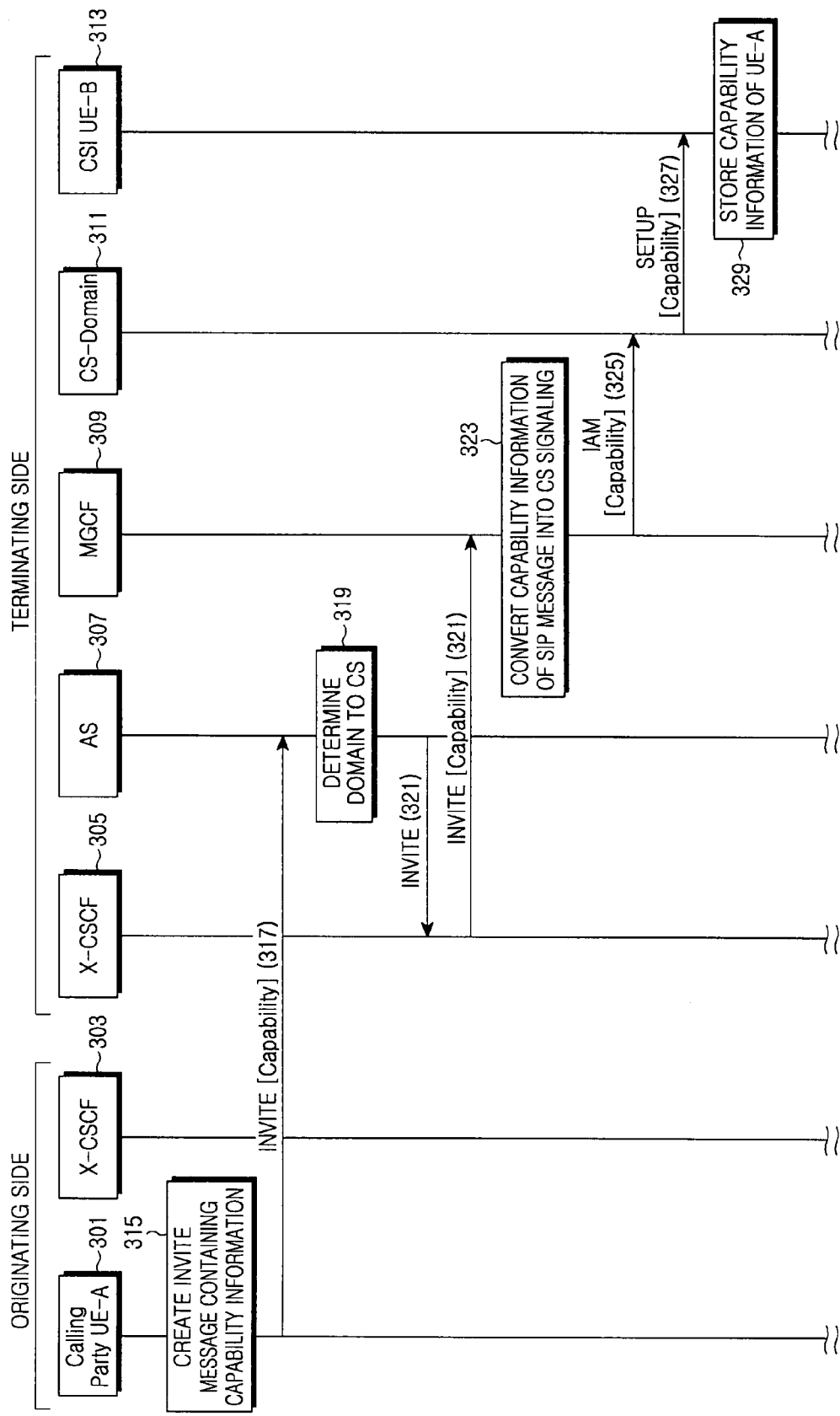
FIGS. 3A and 3B are flowcharts illustrating a message flow when an IMS UE transmits a SIP INVITE message to a CSI UE according to the present invention.
Figure 3B:
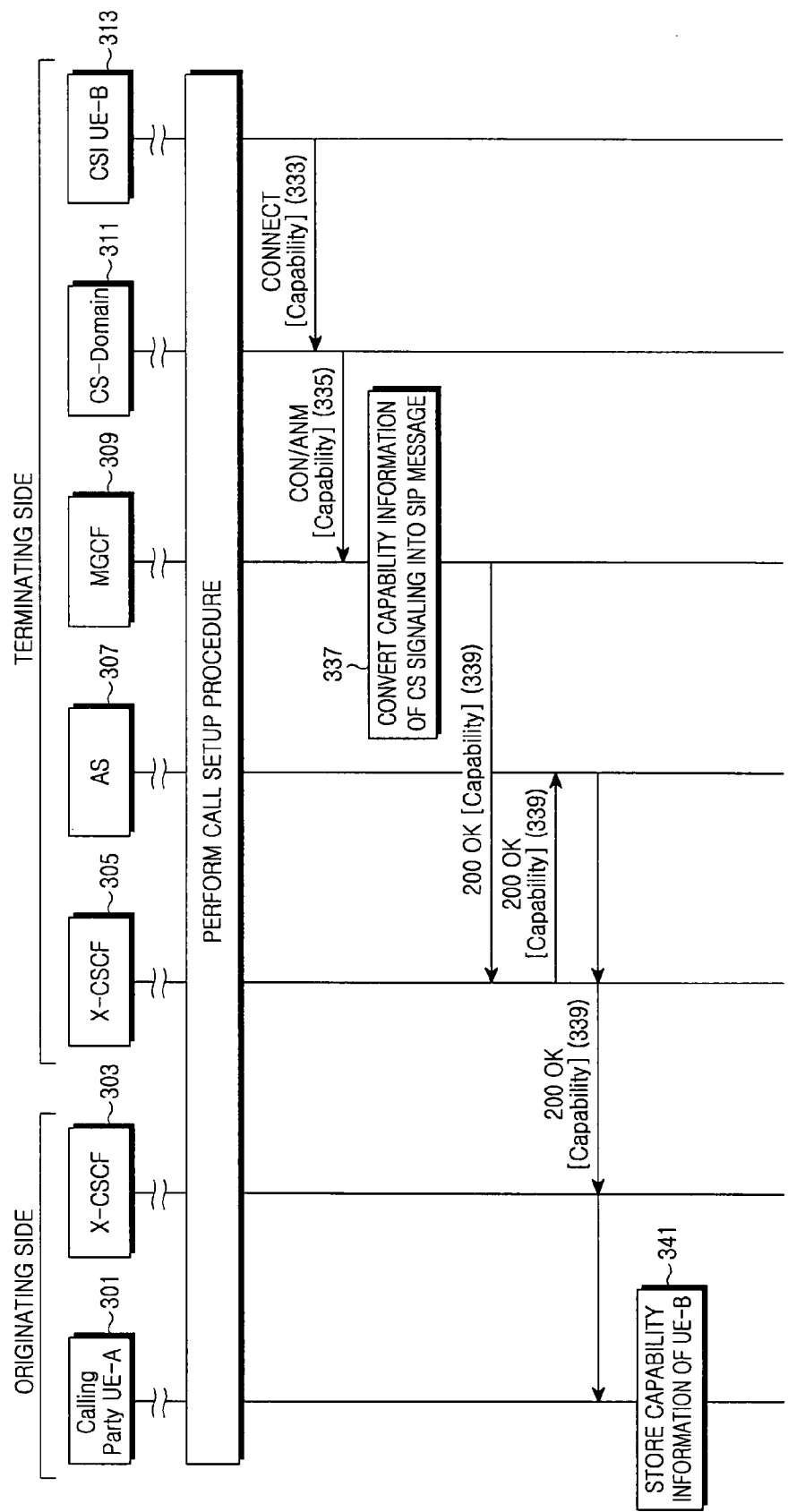

FIGS. 3A and 3B are views illustrating a message flow when a CSI-incapable IME UE transmits a SIP INVITE message to a CSI UE according to another embodiment of the present invention. The CSI-incapable IMS UE represents a UE which does not support only CSI simultaneously using a CS call and an IMS session, but can transmit/receive capability information through a SIP message and can recognize the received capability information.

In FIG. 3, calling-party UE-A 301, which does not support CSI but can process capability information, creates a SIP INVITE message including its own capability information in step 315. In this case, the UE-A 301 inserts its own capability information into the SIP INVITE message by using one of the four schemes described above. The SIP INVITE message created by the UE-A 301 is transferred to a SIP AS 307 of a terminating-side network via an X-CSCF 303, which is an IMS network entity of an originating-side network, and via an X-CSCF 305, which is an IMS network entity of the terminating-side network in step 317.

In this case, the SIP INVITE message is routed to the SIP AS 307 via the originating-side network and terminating-side network based on an existing routing scheme. The SIP AS 307 receives the SIP INVITE message for a session/call setup request from the UE-A 301, which is a CSI-incapable IMS UE, and determines whether to forward the SIP INVITE message to a specific domain, that is, an IMS domain or a CS domain in step 319. The SIP AS 307 includes various types of ASs, which include a Network Domain Selection (NeDS) AS having a function of forwarding a message received from a terminating-side network, a Call Continuity Control Function (CCCF) AS having the NeDS function for VCC service and a function of providing continuity between an IMS session and a CS call, and a CSI AS having the NeDS function and a function of separating an IMS session into a CS voice call and an IMS data session.

In this case, the SIP AS 307 determines a domain to which the SIP INVITE message is to be transferred by analyzing a media parameter included in the SIP INVITE message. By the SIP AS 307, voice media information included in the SIP INVITE message is transferred to UE-B 313 which is a called-party CSI UE through a network entity 311 of the CS domain. Also, if the SIP INVITE message which the SIP AS 307 has received from the UE-A 301 includes media information in addition to the voice media, the media information may be transferred through network entities of the IMS domain to the UE-B 313 which is a CSI UE. The procedure of separating and transferring a SIP INVITE message to the CS domain and IMS domain has no direct relation to the present invention, so a detailed description thereof will be omitted.

When determining to transfer voice media information contained in the SIP INVITE message through the CS network entity, the SIP AS 307 transfers the voice media information of the SIP INVITE message through the IMS network entity 305 to an MGCF 309 located in the same network as the SIP AS 307 so that the voice media information can be converted into a CS message in step 321. When having received the SIP INVITE message, the MGCF 309 checks if the SIP INVITE message contains capability information of the UE-A 301. Then, if the SIP INVITE message contains capability information of the UE-A 301 which has been encoded, the MGCF 309 inserts the capability information into user-user information by encoding the capability information based on a user-user information format, and creates an ISUP/BICC IAM including the user-user information in step 323.

The MGCF 309 transfers the ISUP/BICC IAM to the CS network entity 311 which can access the UE-B 313 in step 325.

When having received the ISUP/BICC IAM, the CS network entity 311 converts the ISUP/BICC IAM into a CC setup message for a CS-call setup, and transfers the CC setup message to the UE-B 313 in step 327. When having received the CC setup message, the UE-B 313 stores the capability information of the UE-A 301 which is contained in the CC setup message in step 329. Through the storage of the capability information of the UE-A 301 which is contained in the CC setup message, the UE-B 313 can recognize the capability information of the UE-A 301, and can determine through the capability information if the UE-B 313 can set a connection with the UE-A 301 though the IMS domain.

After performing supplementary processes required for a call setup between the UE-A 301 and UE-B 313 in response to the CC setup message in step 331, or directly after receiving the CC setup message, the UE-B 313 creates a CC CONNECT message in response to the CC setup message. The created CC CONNECT message contains user-user information, which includes capability information of the UE-B 313 which has been encoded. The CC CONNECT message created by the UE-B 313 is transferred to the CC network entity 311 in step 333. Then, the CC network entity 311 converts the CC CONNECT message into an ISUP/BICC CON/ACM/ANM and transfers the ISUP/BICC CON/ACM/ANM to the MGCF 309 in step 335.

When having received the ISUP/BICC CON/ACM/ANM, the MGCF 309 transforms the capability information of the UE-B 313, which is included in the user-user information within the ISUP/BICC CON/ACM/ANM, based on an appropriate encoding scheme for insertion into a SIP message, and inserts the transformed capability information into a SIP 183 session progress message or SIP 200 OK message, which is a SIP response to the SIP INVITE message in step 337. The schemes of encoding and inserting the capability information included in the user-user information into a SIP message are the same as those described above. The SIP 183/200 OK message created by the MGCF 309 is transferred to the UE-A 301 in the reverse direction of the routing path of the SIP INVITE message, that is, via the terminating-side IMS network entity 305, the SIP AS 307, the terminating-side IMS network entity 305 and the originating-side IMS network entity 303 in step 339. When having received the SIP 183/200 OK message containing the capability information of the UE-B 313, the UE-A 301 stores the capability information of the UE-B 313 in a memory in step 341.

Figure 4:
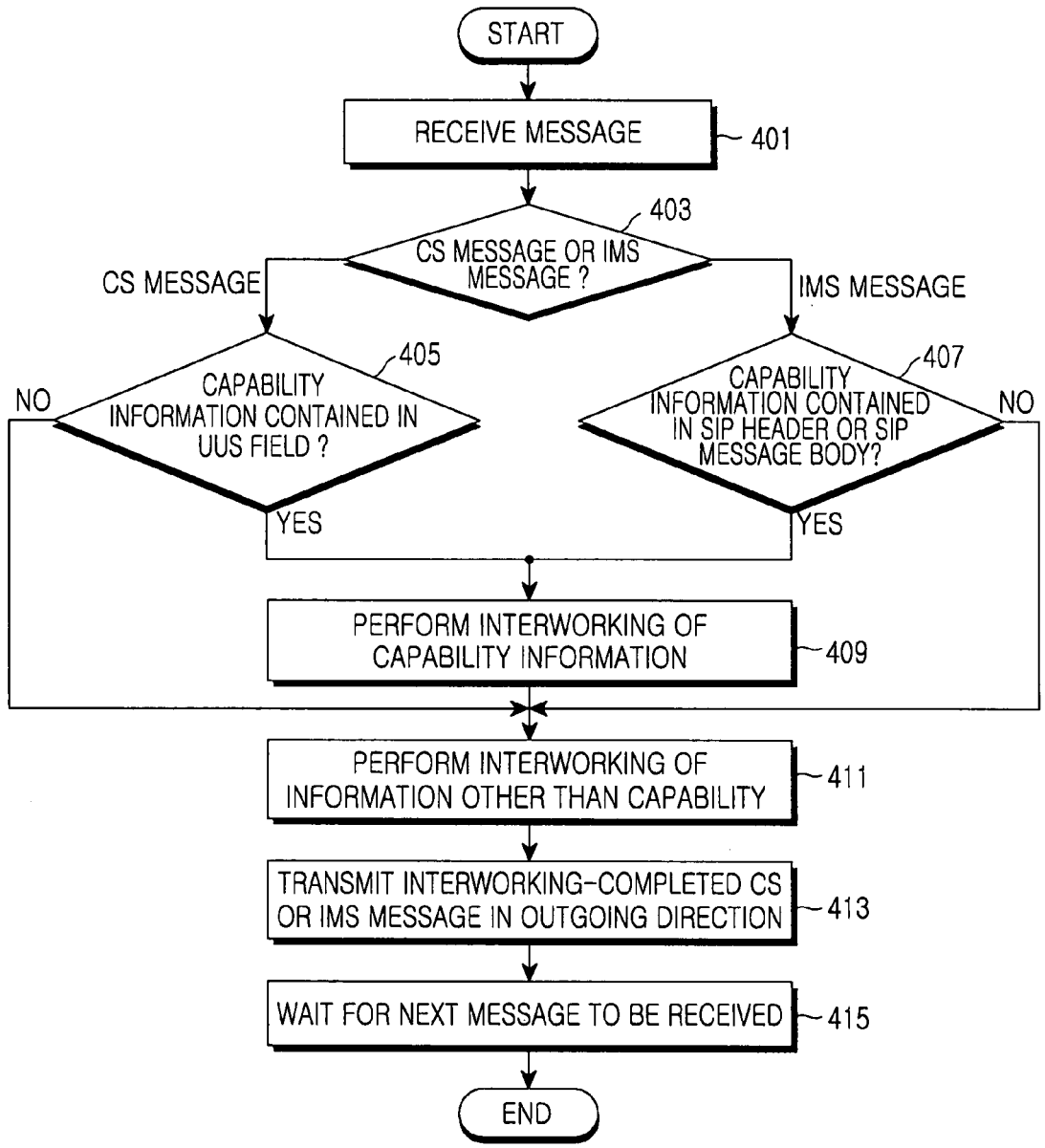
FIG. 4 is a flow diagram illustrating the process of an MGCF according to the present invention.

FIG. 4 is a flow diagram illustrating the process of an MGCF according to an embodiment of the present invention. The MGCF represents a network entity in the IMS domain, which takes charge of interworking between a CS message and an IMS message.

When the MGCF has received an initiated message from a UE in step 401, the MGCF determines if the message corresponds to a CS-call-related message (i.e., a CS message) or an IMS-session-related message (i.e., an IMS message) in step 403. The CS-call-related message includes all messages of an ISUP/BICC protocol type, and the IMS-session-related message includes all messages of a SIP protocol type.

When the received message corresponds to a CS message, the MGCF checks if the CS message includes a UUS field containing the capability information of the UE in step 405. When the CS message does not include a UUS field containing the capability information of the UE, the MGCF proceeds to step 411, in which the MGCF performs an interworking operation for information other than capability information contained in the CS message.

In contrast, when the CS message includes a UUS field containing the capability information of the UE, the MGCF proceeds to step 409, in which the MGCF inserts the capability information into an IMS message converted from the CS message. Although the present invention is described using an example in which the MGCF pre-processes the capability information of a UE and then performs an interworking operation for the other fields, the present invention is not limited to the sequence of processing fields by the MGCF.

Meanwhile, when the message received in step 401 corresponds to an IMS message, the MGCF checks if the capability information of a UE is contained in a SIP message body or SIP header of the IMS message in step 407. If the capability information of the UE is contained in the SIP header or SIP message body, the MGCF proceeds to step 409, in which the MGCF inserts the capability information into a CS message converted from the IMS message. When the capability information of the UE is contained in the SIP header, the capability information may be separately contained in a plurality of SIP headers, which includes a contact header, a user-agent header and a server header, in a feature-tag format or in the respective different formats.

In contrast, when the capability information of the UE is not contained in the IMS message, the MGCF proceeds to step 411, in which the MGCF performs an interworking operation for information other than the capability information contained in the IMS message. As described above, the sequence of processing the fields of the IMS message has no relation to the subject of the present invention.

When the capability information of a UE is contained in the CS message or IMS message, the MGCF performs an interworking operation for the capability information in step 409.

If the message received in step 401 corresponds to a CS message, and the capability information of a UE is contained in the UUS field of the CS message, the MGCF extracts and analyzes the capability information contained in the UUS field, encodes the capability information by means of one of the four schemes, and inserts the encoded capability information into the SIP header or message body of a SIP message, thereby performing an interworking operation for the capability information.

In contrast, if the message received in step 401 corresponds to an IMS message, and the capability information of a UE is contained in a SIP message body or SIP header of the IMS message, the MGCF extracts and analyzes the capability information, and inserts the encoded capability information into the UUS field of a CS setup message based on a relevant encoding format.

Then, in step 411, the MGCF performs an interworking operation for other information fields, except for the capability information of the UE, in the CS message or the IMS message. In detail, the MGCF converts the other information fields into corresponding fields in the IMS message or CS message. Next, in step 413, a message resulting from the interworking operation is transmitted in a corresponding outgoing direction. Then, in step 415, the MGCF waits for a next message to be received, and returns to step 401.

Figure 5:
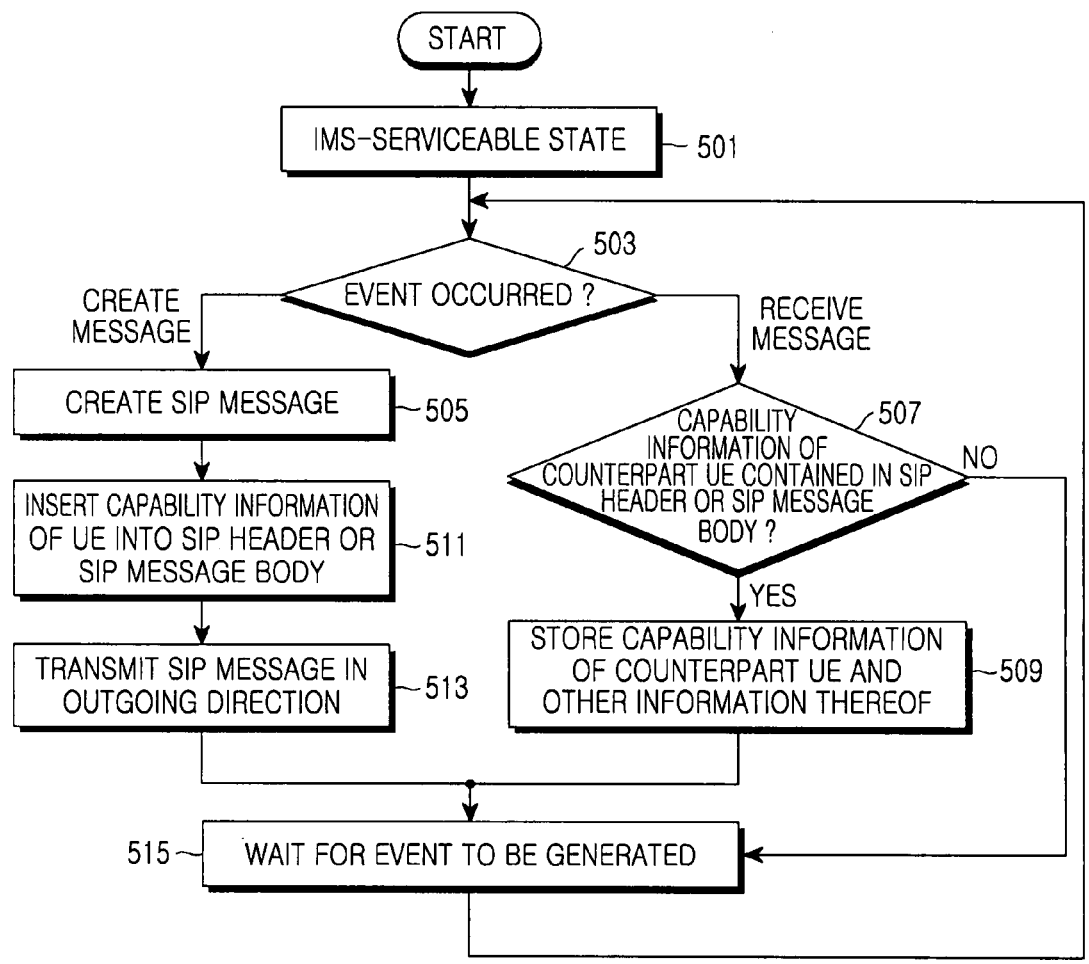
FIG. 5 is a flow diagram illustrating the process of a UE according to the present invention.

FIG. 5 is a flow diagram illustrating the process of a UE according to one embodiment of the present invention. The UE does not support the CSI, but has a function of receiving, analyzing and storing capability information of a peer UE, which is included within a SIP message, in the UE.

In FIG. 5, in step 501, an IMS UE accesses a network, performs a procedure for security, connection (i.e., attachment), etc., thereby completing IMS registration to receive IMS service.

In step 503, the UE determines if an event, such as a message reception or a message creation, is generated. Described below is the process only for the message reception and message creation related to the present invention, from among various events which may be generated in the UE.

When a "message creation" event is generated in the UE, the UE creates a SIP message in step 505. In step 511, the UE then inserts its own capability information either into a SIP header (e.g., a contact header, a user-agent header, a server header etc.) of a SIP message or into the message body of the SIP message in a predetermined scheme (e.g., an XML scheme, a binary scheme, a text scheme, etc.). Steps 505 and 511 are separately described for convenience of description, and steps 505 and 511 may be performed at the same time. Next, the UE transmits the SIP message including the capability information in a corresponding outgoing direction in step 513, and proceeds to step 515. In step 515, the UE waits for a next event to be generated and returns to step 503.

When a "message reception" event is generated in the UE, the UE determines if capability information of a peer UE is contained in a SIP header or SIP message body of a received SIP message, which has generated the event, in step 507. When the capability information of the peer UE is contained in the received SIP message, the UE proceeds to step 509. In step 509, the UE processes the capability information of the peer UE, which is contained in the received SIP message, and the fields of the received SIP message, and stores the processed information therein according to necessity. Conversely, when the capability information of the peer UE is not contained in the received SIP message, the UE performs general operations for processing the received SIP message, and proceeds to step 515. In step 515, the UE waits for a next event to be generated and returns to step 503.

The following description will be given about a scheme for/utilizing a SIP AS in order to transfer capability information of a peer UE to a CSI UE so that the SIP AS can encode capability information of a UE according to an embodiment of the present invention.

When a CS-call setup is generated between a CSI-capable CSI UE and an IMS UE, a SIP INVITE message transmitted from the IMS UE is transferred to a CSI AS located in the same network as the CSI UE. The IMS UE may be an IMS UE which has generated the SIP INVITE message, or may be a VCC UE. If the IMS UE is a VCC UE, a CS message generated from the VCC UE is converted into an IMS message by a VCC AS supporting VCC service, and then is transferred to a receiving side. The CSI AS receives an INVITE message transferred to the CSI UE, converts voice media information among media information included in the INVITE message into a CS setup message, transfers the CS setup message to a CS domain, converts media information regarding video, data and so on into a SIP INVITE message, and then transfers the SIP INVITE message to an IMS domain.

When an IMS UE transfers a SIP INVITE message to a CSI UE receiving CSI through a CSI AS in order to establish an IMS session for VoIP service between the IMS UE and the CSI UE, the CSI AS transfers voice media information in the SIP INVITE message to an MGCF located in the same network as the CSI AS so that a CS-call setup message can be transferred to the CSI UE through the CS domain. In this case, since the CSI UE cannot receive capability information of the IMS UE, the CSI UE cannot identify if the peer UE is an IMS UE. In addition, since the CSI UE cannot receive other capability information required for the CSI, it is impossible to normally provide the CSI. Also, when an IMS UE transmits a SIP INVITE message in order to establish an IMS session for multimedia service between the IMS UE and a CSI UE, the CSI UE cannot receive capability information of the IMS UE through a CS-call setup message, so that it is impossible to provide the CSI.

As described above, when a UE cannot contain its own capability information in a request message transmitted from the UE, a SIP AS according to an embodiment of the present invention inserts the capability information of the UE into the request message, and then transfers the request message to a peer UE. In detail, the present invention proposes a scheme of utilizing a CSI AS in order to generate and transfer capability information of an IMS UE to a CSI UE, and a scheme of utilizing a VCC AS (or an MGCF located in the same network as the VCC UE, i.e., an MGCF located in an originating-side network) and a CSI AS in order to generate and transfer capability information of a VCC UE to a CSI UE.

The VCC UE can support both CS service and IMS service, provided that the VCC UE can use service through either the CS domain or the IMS domain depending on the preference of the user, the policy of the provider, a network environment and a radio environment. In contrast to the VCC UE, the CSI UE can use services through the IMS domain and CS domain at the same time.

According to the scheme of utilizing a CSI AS in order to add capability information of an IMS UE, when a CSI UE supporting capability exchange and a normal $3^{rd}$ Generation (3G) IMS UE not supporting capability exchange communicate with each other, capability information of the IMS UE is transferred to the CSI UE through the CSI AS.

The IMS UE can separately use the CS service and the IMS service, but cannot use the combined CS and IMS service, that is, CSI. Therefore, in the following description, the IMS UE is defined as a UE not having a capability exchange function which a CSI UE has. In addition, the CSI AS is a SIP AS located in an IMS network of a called-party UE, receives a SIP INVITE message transferred from a transmitting side to a receiving side, analyzes a type of media included in the SIP INVITE message, transmits voice media information included in the SIP INVITE message to a CS domain so that the voice media information can be transferred into a CS call, and transmits video and packet media information and so on through an IMS domain.

Figure 6A:
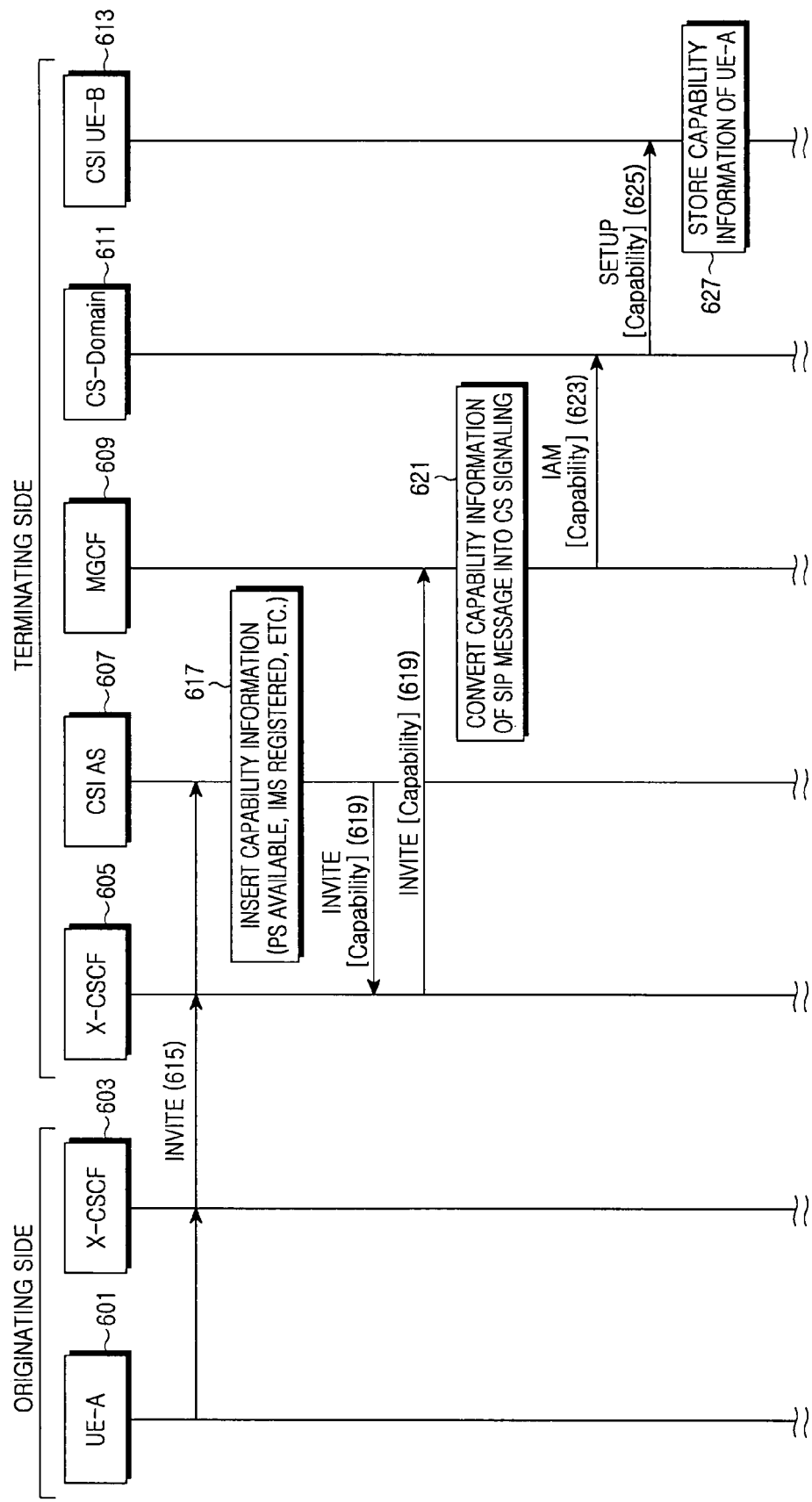
FIGS. 6A and 6B are flowcharts illustrating a message flow when an IMS UE transmits a VoIP call request to a CSI UE according to the present invention.
Figure 6B:
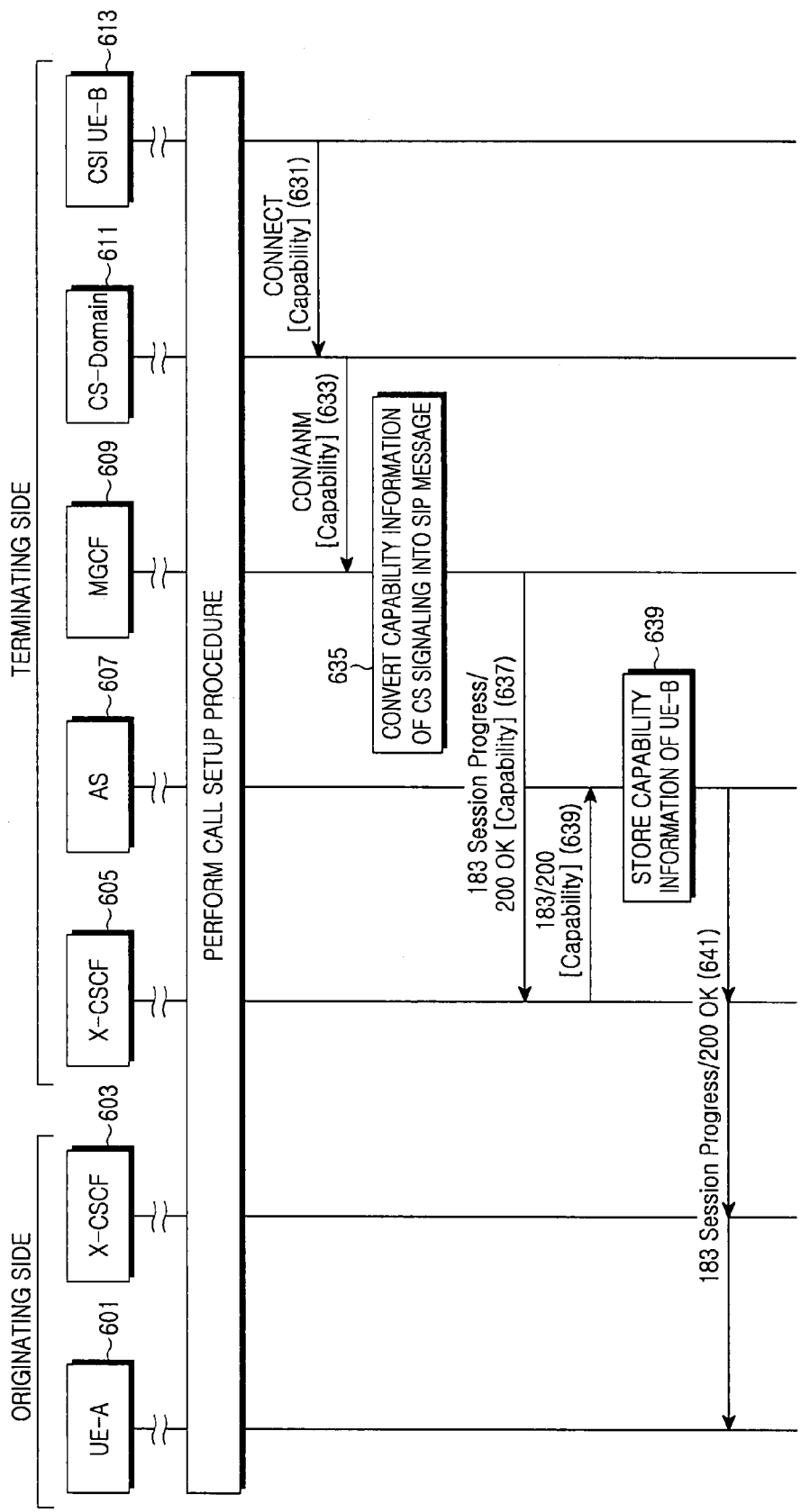

FIGS. 6A and 6B are flow charts illustrating a message flow when an IMS UE transmits a VoIP call request to a CSI UE according to an embodiment of the present invention.

UE-A 601, which is a calling UE capable of using IMS service, is a general 2G/3G UE which does not support CSI and VCC service, but can separately use CS service and IMS service. That is, the UE-A 601 is a pure IMS UE. The UE-A 601 generates a SIP INVITE message in order to establish a VoIP session with UE-B 613, which is a called-party CSI UE in step 615. In this case, the SIP INVITE message does not contain capability information of the UE-A 601. The SIP INVITE message is routed to an X-CSCF 603, which is a network entity of an IMS domain to which the UE-A 601 belongs, and to an X-CSCF 605, which is an IMS network entity of a terminating-side network to which the UE-B 613 belongs, and then is transferred to a CSI AS 607 operating in a proxy scheme according to a rule (e.g., initial filter criteria of the UE-B 613) predetermined in the terminating-side IMS network entity 605 in step 615.

Upon confirming that the SIP INVITE message has been received through the IMS domain, the CSI AS 607 determines that the UE-A 601, which is the source of the SIP INVITE message, can use service through a PS domain and is in an IMS-registered state. Based on such determination, the CSI AS 607 encodes and inserts capability information, such as "PS available," which is service capability information of the UE-A 601, "IMS registration," which is IMS state information, etc., into the SIP header or message body of the SIP INVITE message in step 617. In other words, the CSI AS 607 constructs the capability information by acquiring all capability information obtainable from the SIP INVITE message transferred from the UE-A 601 and/or through estimation, and inserts the capability information into the SIP INVITE message.

In detail, the CSI AS 607 can determine whether the UE-A 601 has requested service in a CS domain or in a PS domain and can determine information about services which the UE can use, by checking header information, such as a service ID, "From header" information, "Contact header" information, and a Globally Routable UA URI (GRUU) including application service information, which have been contained in the SIP INVITE message. For example, when the "From Header" information is set as "user=phone," it represents that the UE-A 601 corresponds to a CS UE.

According to another embodiment of the present invention, when the network provides network entities which operate as a database to store capability information about each subscriber UE, the CSI AS 607 acquires CS/PS available information about the UE-A 601 and other capability information thereabout through a query process with the network entities.

That is, the CSI AS 607 determines whether the UE-A 601 can use service through a PS domain or can use service through a CS domain, and determines if the UE-A 601 has been registered in an IMS domain, by analyzing header information contained in the SIP INVITE message, or by using the capability information of the UE-A 601 acquired through a query process with another network entity.

As schemes for inserting the capability information into the SIP INVITE message through encoding includes, there are, as described above, a first scheme of adding a supplementary feature tag to a SIP header, a second scheme of recording the capability information in the message body of a SIP message in an XML format, a third scheme of recording the capability information in the message body of a SIP message in a text format, and a fourth scheme of recording the capability information in the message body of a SIP message in a binary format.

The SIP INVITE message requesting VoIP service, which has been initiated by the UE-A 601, is converted into a SIP INVITE message with the capability information of the UE-A 601 inserted through encoding by the CSI AS 607, as described above, and then is transferred to an MGCF 609 of the terminating-side network through the IMS network entity 605 in step 619. Routing the SIP INVITE message from the CSI AS 607 to the MGCF 609 is based on a technology stipulated in a corresponding standard, e.g., in the 3GPP standard. The MGCF 609 converts the SIP INVITE message containing the capability information of the UE-A 601 into an ISUP/BICC IAM which is a CS message in step 621. In this case, the capability information of the UE-A 601 is encoded and inserted into the UUS information field in the ISUP/BICC IAM.

When the capability information of the UE-A 601, which has been inserted by the CSI AS 607, is encoded and inserted into the UUS information field, the capability information transferred through the UUS information field may have, for example, a format as shown in Table 1 above. A detailed scheme of encoding and inserting the capability information into the UUS information filed in the CS message is based on an implementing method or a method stipulated in a corresponding standard.

The ISUP/BICC IAM created through the CS/IMS conversion function of the MGCF 609 is transferred to a network entity 611 (e.g., MSC) of a CS domain to which the UE-B 613 belongs in step 623. The CS network entity 611, which identifies information about the location of the UE-B 613 in the CS domain, converts the ISUP/BICC IAM into a CC setup message, and then transfers the CC setup message to the UE-B 613 in step 625. The UE-B 613 extracts the capability information of the UE-A 601, which has been added by the CSI AS 607, from the CC setup message, recognizes that the message has been initiated from the UE-A 601, and stores the capability information of the UE-A 601 in step 627. Based on the capability information of the UE-A 601 stored as described above, the UE-B 613 identifies that the UE-B 613 can establish an IMS session with the UE-A 601 in the future. When necessary, a call setup procedure is performed between the UE-A 601 and UE-B 613 in step 629.

When a call setup has been completed, the CSI UE-B 613 transmits a CC CONNECT message in response to the CC setup message (step 631). The user-user information field (i.e., UUS information field) of the CC CONNECT message created by the CSI UE-B 613 contains capability information of the UE-B 613 to be transferred to the UE-A 601, which is the peer UE of the UE-B 613. The CS network entity 611 converts the CC CONNET message into an ISUP/BICC CON/ANM and transfers the ISUP/BICC CON/ANM to the MGCF 609 in step 633. The MGCF 609 converts the ISUP/BICC CON/ANM into a SIP 183 session progress message or SIP 200 OK message, which is a SIP response to the SIP INVITE message in step 635. In this case, the MGCF 609 encodes and inserts the capability information of the UE-B 613, which has been extracted from the ISUP/BICC CON/ANM, into the SIP 183 session progress message or SIP 200 OK message in step 635. In order to encode and insert the capability information into the SIP 183/200 OK message, one of the four schemes described above is used.

The SIP 183/200 OK message is transferred to the CSI AS 607 via the IMS network entity 605 of the UE-B 613 in step 637. When having received the SIP 183/200 OK message, the CSI AS 607 extracts and stores the capability information of the UE-B 613 which is contained in the SIP 183/200 OK message in step 639. Then, the CSI AS 607 transfers the SIP 183/200 OK message either as it is or after eliminating the capability information of the UE-B 613 from the SIP 183/200 OK message, to the UE-A 601 in step 641. In this case, the SIP 183/200 OK message is transferred to the UE-A 601 based on a SIP message routing scheme in an IMS domain, which is specified in a corresponding standard, e.g., the 3GPP standard. The capability information of the UE-B 613, which has been stored in the CSI AS 607, may be used upon an IMS access between the UE-A 601 and UE-B 613 in the future.

The following description will be given about an example in which mutual capability information is exchanged between a CSI UE supporting capability exchange and a VCC UE not supporting capability exchange by utilizing a CSI AS and a VCC AS in such a manner that the capability information of the VCC UE is transmitted to the CSI UE through the CSI AS and VCC AS when the CSI UE and VCC UE communicate with each other. The VCC UE can separately use CS and IMS services, but cannot use a combined CS and IMS service, that is, CSI, so that the VCC UE cannot perform capability exchange, differently from the CSI UE. Also, the VCC AS determines one of CS and IMS domains to which a service request of a UE is to be transferred, based on various criteria which include the radio environment of the UE, the policy of the user and provider, etc. In addition, the VCC AS corresponds to a SIP AS which takes charge of a CS originating function for domain transference either from a CS call to an IMS session or from an IMS session to a CS call, and an anchoring function for a CS call, and operates based on a technology defined by a corresponding standard, e.g., the 3GPP standard.

Figure 7A:
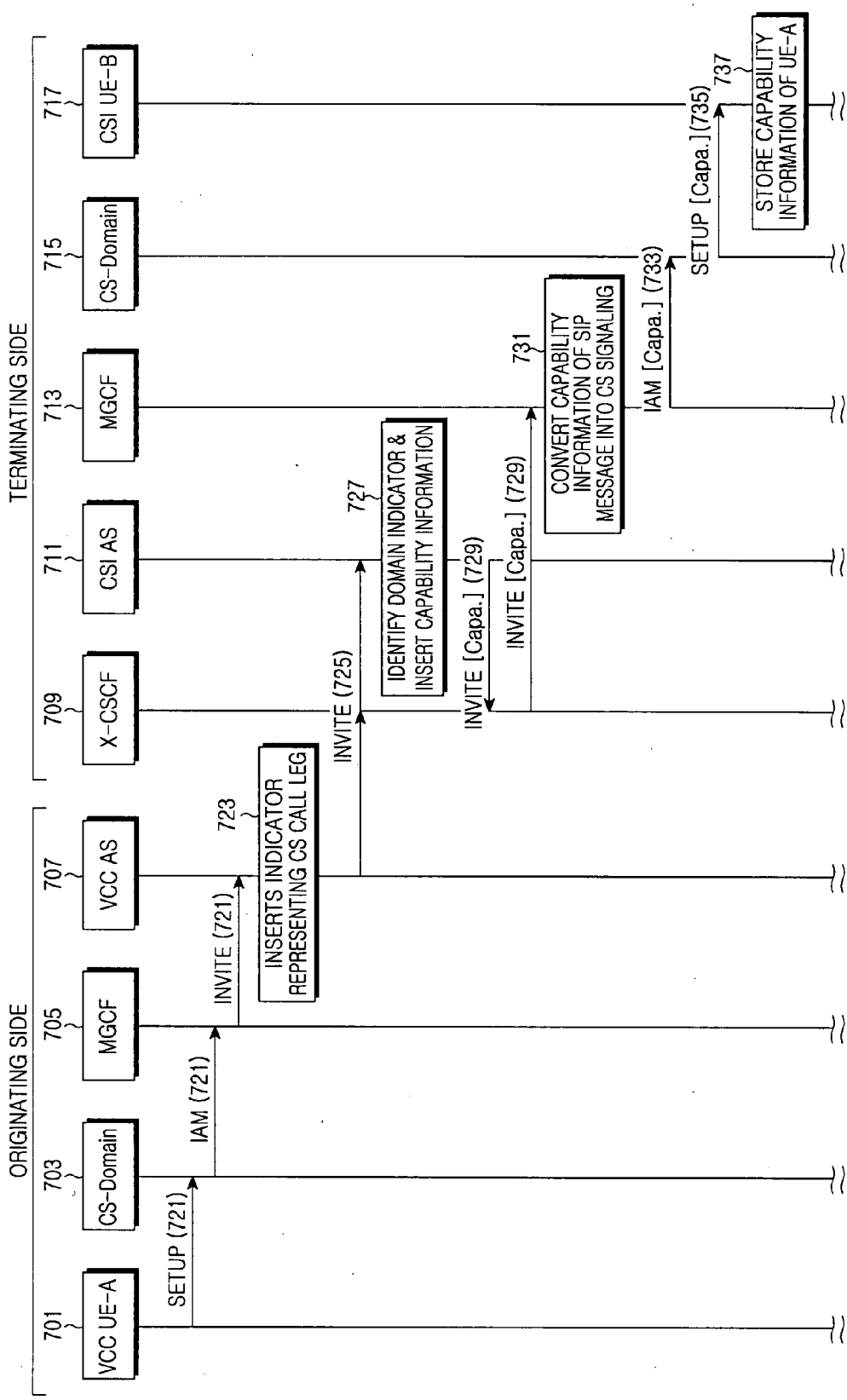
FIGS. 7A and 7B are flow chart illustrating a message flow when a VCC UE transmits a CS call request to a CSI UE according to the present invention.
Figure 7B:
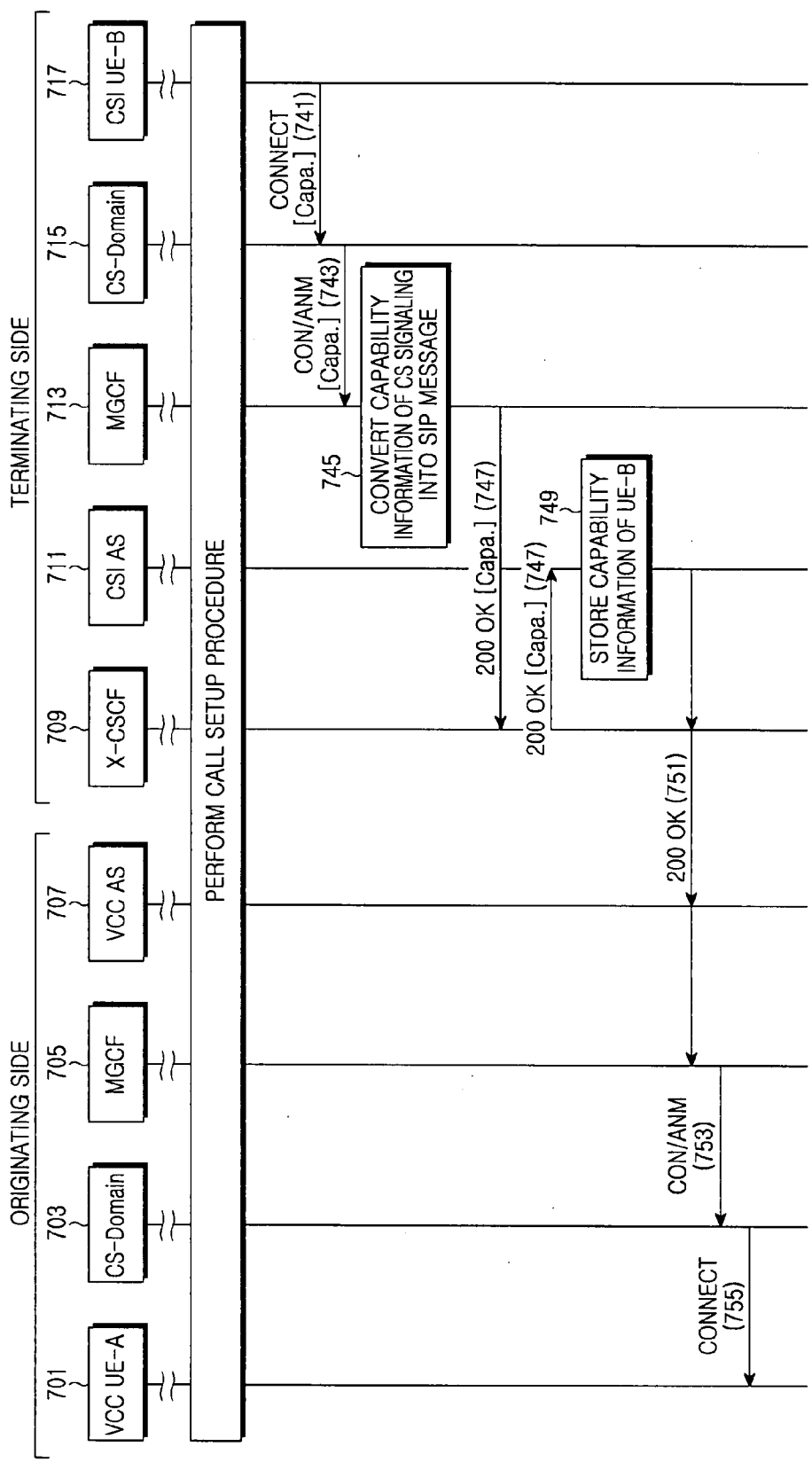

FIGS. 7A and 7B are flow charts illustrating a message flow when a VCC UE transmits a CS call request to a CSI UE according to an embodiment of the present invention.

UE-A 701, which is a VCC UE, transmits a CS-call setup message for requesting a CS call to UE-B 717, which is a called-party CSI UE in step 721. The CS-call setup message is converted into an ISUP/BICC IAM, which is a CS message, by a network entity 703 (e.g., MSC) of a CS domain, and is then transferred to an MGCF 705 located in the same network as the UE-A 701 in step 721. The MGCF 705 converts the ISUP/BICC IAM into a SIP INVITE message, which is an IMS message, and then transfers the SIP INVITE message to a VCC AS 707 through an IMS network in step 721.

The VCC AS 707 analyzes transmitter information contained in the SIP INVITE message, and determines whether the SIP INVITE message has been transmitted from a CS domain or from an IMS domain. When the SIP INVITE message has been transmitted from the CS domain, the VCC AS 707 inserts a domain indicator representing the domain from which the SIP INVITE message has been initiated into the SIP INVITE message in step 723. The domain indicator may be contained in a "From header," "Contact header," "P-Asserted-Identity header" or "P-Charging-Vector header," which is a header capable of representing information about a transmitter, within the SIP INVITE message.

Instead of making the VCC AS 707 insert a domain indicator into the SIP INVITE message, the MGCF 705 may insert a domain indicator representing a domain from which the SIP INVITE message has actually been initiated into the SIP INVITE message, while converting the ISUP/BICC IAM into the SIP INVITE message.

The SIP INVITE message containing the domain indicator is transmitted in a corresponding outgoing direction, and is transferred to a CSI AS 711 supporting CSI for the UE-B 717, which is a called-party CSI UE, through an IMS network entity 709 belonging to a terminating-side network in step 725. The CSI AS 711 determines if the SIP INVITE message contains a domain indicator representing a CS call leg. When the SIP INVITE message contains a domain indicator, the CSI AS 711 recognizes the fact that the SIP INVITE message has been triggered by a CS-call setup message from the CS domain. Then, the CSI AS 711, in place of the UE-A 701, adds capability information of the UE-A 701 to the SIP INVITE message, based on the domain indicator and information contained in the SIP INVITE message in step 727. As described above, the capability information may be extracted from the SIP INVITE message or may be estimated by other means.

In this case, the capability information may include service capability information (e.g., "PS unavailable") representing whether or not the UE-A 701 is located in the CS domain, version information representing whether or not the capability information has changed, IMS state information (e.g., "IMS unregistered") representing registration or unregistration of IMS, and an ID for identifying a specific UE belonging to a user, and may further include various capability information which can be efficiently utilized through exchange between UEs.

Also, when the CSI AS 711 checks a media parameter contained in the SIP INVITE message and determines that voice media information is included in the SIP INVITE message, the CSI AS 711 transmits the SIP INVITE message to an MGCF 713 through the IMS network entity 709 of the terminating-side network so that the SIP INVITE message can be transferred to the UE-B 717 via the CS domain in step 729. When having received the SIP INVITE message containing the capability information of the UE-A 701, the MGCF 713 converts the capability information contained in the SIP INVITE message into the user-user information in the ISUP/BICC IAM by means of the aforementioned four schemes in step 731. The ISUP/BICC IAM converted by the MGCF 713 is transferred to a network entity 715 of the CS domain to which the UE-B 717 belongs in step 733. The CS network entity 715 converts the ISUP/BICC IAM into a CC setup message and transfers the CC setup message to the UE-B 717 in step 735. The UE-B 717 extracts the capability information of the UE-A 701 from the CC setup message and stores the extracted capability information in step 737. Thereafter, when necessary, exchange of supplementary messages required for a call setup between the UE-A 701 and UE-B 717 are additionally performed in step 739.

The UE-B 717 creates a CC CONNECT message containing its own capability information in response to the CC setup message, and transfers the CC CONNECT message to the CS network entity 715 in step 741. The CS network entity 715 converts the CC CONNECT into an ISUP/BICC CON/ANM, and transfers the ISUP/BICC CON/ANM to the MGCF 713 in step 743. In this case, routing the ISUP/BICC CON/ANM from the CS network entity 715 to the MGCF 713 is based on a technology stipulated in a corresponding standard, e.g., in the 3GPP standard.

The MGCF 713 converts the ISUP/BICC CON/ACM/ANM into a SIP 183 session progress message or SIP 200 OK message, and encodes and inserts the capability information of the UE-B 717, which has been contained in the user-user information of the ISUP/BICC CON/ACM/ANM, into the SIP 183/200 OK message by means of the aforementioned four schemes in step 745. The SIP 183/200 OK message converted by the MGCF 713 is transferred to the CSI AS 711 through the IMS network entity 709 to which the UE-B 717 belongs based on a technology stipulated in a corresponding standard, e.g., in the 3GPP standard in step 747.

The CSI AS 711 extracts and stores the capability information contained in the SIP 183/200 OK message in step 749, and then outputs the SIP 183/200 OK message in an outgoing direction as it is. In this case, the CSI AS 711 may output the SIP 183/200 OK message after deleting the capability information from the SIP 183/200 OK message. If the UE-A 701 to which the SIP 183/200 OK message is to be transferred cannot recognize the capability information, the CSI AS 711 disregards the capability information. In contrast, when the UE-A 701 can recognize the capability information, the CSI AS 711 stores the capability information so as to utilize the capability information upon service for the UE-A 701 in the future.

The SIP 183/200 OK message transferred to the CSI AS 711 is transferred to the MGCF 705 of the originating-side network to which the UE-A 701 belongs based on a technology defined by a corresponding standard, e.g., the 3GPP standard and VCC service standard in step 751. The MGCF 705 converts the SIP 183/200 OK message into an ISUP/BICC CON/ACM/ANM and transfers the ISUP/BICC CON/ACM/ANM to the CS network entity 703 in step 753. The CS network entity 703 converts the ISUP/BICC CON/ACM/ANM into a CC CONNECT message and transfers the CC CONNECT message to the UE-A 701 in step 755. The capability information of the UE-B 717, which is contained in the ISUP/BICC CON/ACM/ANM, is stored in the UE-A 701 so as to be used in the future.

When the MGCF of the IMS network, in which a VCC UE is located, can perform conversion of capability information, the MGCF may encode and inserts a relevant domain indicator together with other capability information into a SIP INVITE message. In contrast, when the MGCF of the IMS network, in which a VCC UE is located, cannot perform conversion of capability information, the VCC AS inserts a relevant domain indicator into a SIP INVITE message. The domain indicator contained in the SIP INVITE message by the VCC AS 707 or MGCF 705 may instruct a CS call leg or IMS call leg in order to represent a domain from which a call request has been originated.

That is, when a SIP INVITE message received by the VCC AS contains capability information therein, the VCC AS does not add a domain indicator of a CS call leg to the received SIP INVITE message. In contrast, when a SIP INVITE message received by the VCC AS does not contain capability information therein, the VCC AS adds a domain indicator of a CS call leg to the received SIP INVITE message before transmitting the SIP INVITE message in a corresponding outgoing direction.

Figure 8:
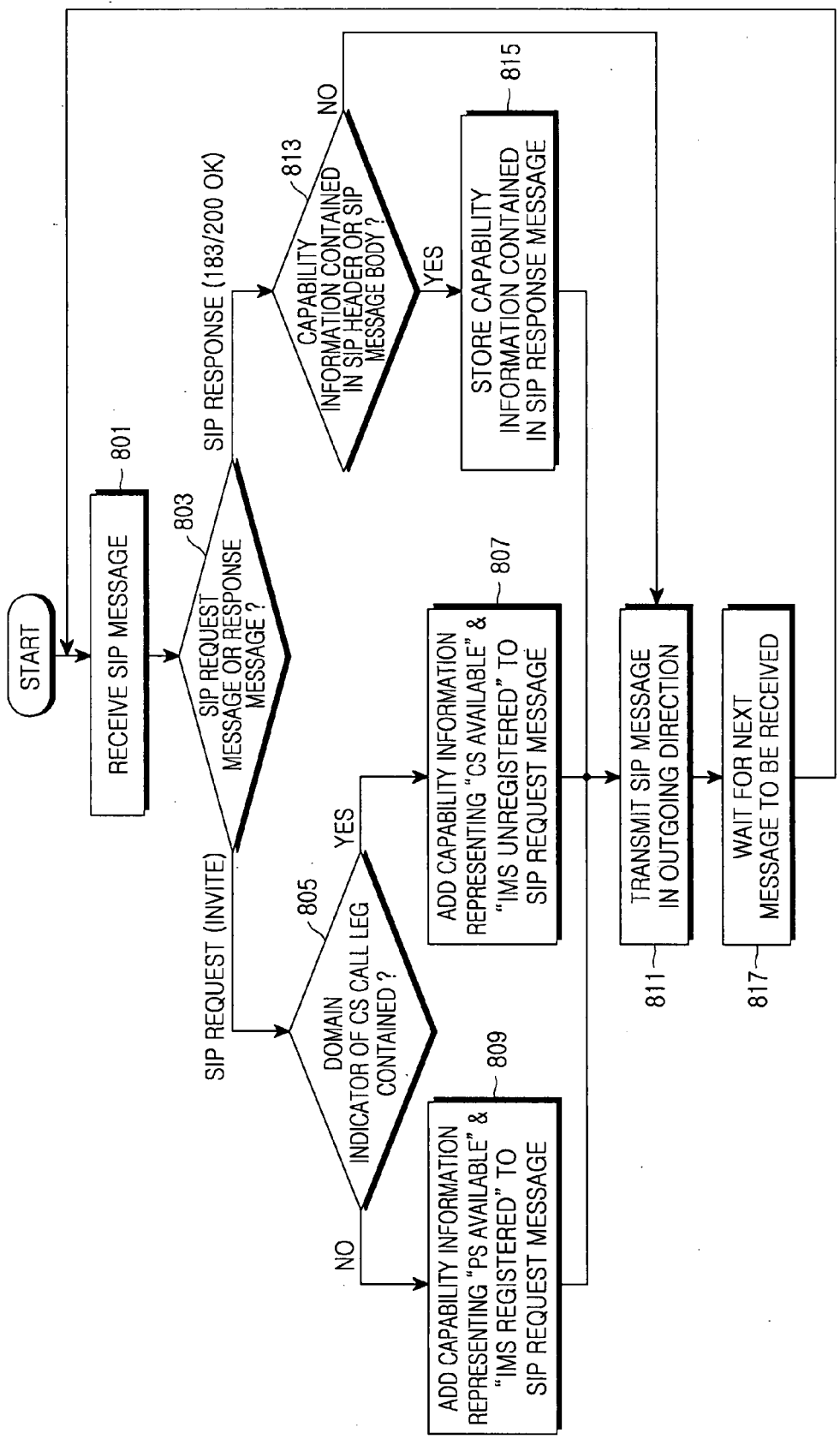
FIG. 8 is a flow diagram illustrating the process of a CSI AS according to the present invention.

FIG. 8 is a flow diagram illustrating the operation of a CSI AS according to an embodiment of the present invention, in which the CSI AS is illustrated as an example of a SIP AS processing capability information.

In step 801, a CSI AS receives a SIP message initiated by a UE. In step 803, the CSI AS determines whether the SIP message corresponds to a SIP request message such as an INVITE message or corresponds to a SIP response message such as a 183 session progress or 200 OK message. When the SIP message corresponds to a SIP request message, the CSI AS proceeds to step 805, and when the SIP message corresponds to a SIP response message, the CSI AS proceeds to step 813.

In step 805, the CSI AS determines if the SIP request message contains a domain indicator of a CS call leg therein. The domain indicator is acquired from information contained in the message body of the SIP request message or from a SIP header containing information about a transmitter that has originated the SIP request message. When the SIP request message contains a domain indicator representing a CS call leg, the CSI AS proceeds to step 807, and when the SIP request message does not contain a domain indicator representing a CS call leg, the CSI AS proceeds to step 809. For example, when the SIP request message contains no domain indicator, or when the SIP request message contains a domain indicator not representing a CS call leg, the CSI AS proceeds to step 809.

In step 807, the CSI AS adds capability information, which includes service capability information (e.g., "CS available") set as either a value representing that the UE is in service through a CS domain or a value representing that service through a PS domain is impossible, and IMS state information set as a value representing that the UE has been unregistered in the IMS, to the SIP request message.

In step 809, the CSI AS adds capability information, which includes service capability information (e.g., "PS available") set as either a value representing that service through the PS domain is possible or a value representing that service through the CS and PS domains at the same time is possible, and IMS state information set as a value representing that the UE has been registered in the IMS, to the SIP request message.

In step 811, the CSI AS transmits the SIP request message, which has been corrected to contain the capability information, in a corresponding outgoing direction, and then proceeds to step 817. In step 817, the CSI AS waits for a next message to be received, and then returns to step 801.

When it is determined in step 803 that the SIP message corresponds to a SIP response message, the CSI AS determines if capability information of the UE is contained in a SIP header of message body of the SIP response message in step 813. When the SIP response message contains capability information, the CSI AS proceeds to step 815, and when the SIP response message does not contain capability information, the CSI AS proceeds to step 811.

In step 815, the CSI AS extracts and stores the capability information contained in the SIP response message. For example, the CSI AS extracts IMS state information of the UE from the capability information contained in the SIP response message and then stores the extracted IMS state information, determines service capability information of the UE, i.e., information about whether the UE is a PS-capable UE or a CS-capable UE, depending on the type of a domain from which the SIP response message has been initiated, and then stores the determined service capability information. In another case, the SIP response message may contain capability information indicating both the IMS state information and service capability information of the UE.

Thereafter, the CSI AS proceeds to step 811, in which the CSI AS transmits the SIP response message in a corresponding outgoing direction. Then, in step 817, the CSI AS waits for a next message to be received and then returns to step 801.

Figure 9:
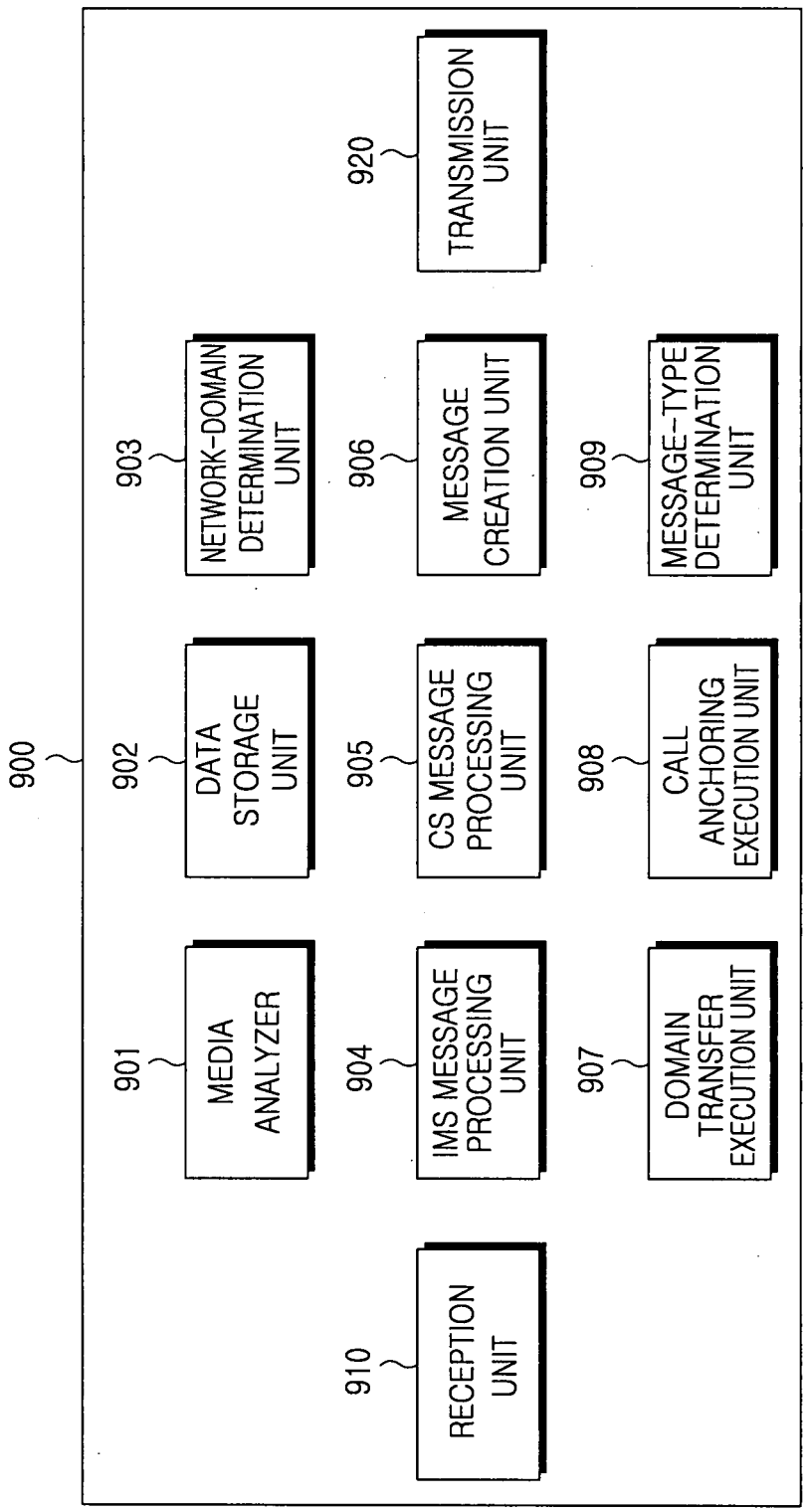
FIG. 9 is a block diagram illustrating the configuration of a SIP AS according to the present invention.

FIG. 9 is a block diagram illustrating the configuration of a SIP AS according to an embodiment of the present invention. Although the following description will be given with reference to the configuration of a SIP AS 900 which includes all the functions of a CSI AS and a VCC AS according to an embodiment of the present invention, it should be clearly understood that each of the CSI AS and VCC AS, which perform mutual different functions, may selectively include the function blocks shown in FIG. 9. The functions of the blocks shown in FIG. 9 will now be described. The function blocks are implemented as hardware blocks or software execution blocks, and are connected to each other through an operation system or system bus, which are not shown.

In FIG. 9, a reception unit 910 and a transmission unit 920 receive a CS message or IMS message from a CS domain or IMS domain, and transmit a CS message or IMS message processed in the SIP AS 900 in a corresponding outgoing direction.

A message-type determination unit 909 determines whether a message received through the reception unit 910 has been transmitted from the CS domain or from the IMS domain.

A media analyzer 901 receives an IMS message from the reception unit 910; distinguishes between voice media information and video/packet media information in the IMS message based on SDP information included in the IMS message and on information contained in the SIP header and SIP message body of the IMS message; and identifies the IMS message according to the type of media contained therein.

A data storage unit 902 temporarily or permanently stores data required for providing service and information contained in received messages.

A network-domain determination unit 903 determines whether to transfer a message received through the reception unit 910 to the CS domain or to the IMS domain, depending on the data and information stored in the data storage unit 902.

A data creation unit 906 creates an IMS message or CS message to be transmitted through the transmission unit 920, and corrects a message received through the reception unit 910 based on information provided by the determination units 903 and 909 and analyzer 901.

An IMS message processing unit 904 corrects an IMS message to be transmitted based on information provided by the determination units 903 and 909 and analyzer 901, and constructs a new IMS message based on a received IMS message or converts a received IMS message into a CS message. In addition, the IMS message processing unit 904 has back-to-back user agent (B2BUA) and interworking functions.

A CS message processing unit 905 corrects a CS message to be transmitted based on information provided by the determination units 903 and 909 and analyzer 901, and constructs a new CS message based on a received CS message or converts a received CS message into an IMS message.

A domain transfer execution unit 907 shifts a UE receiving service through a CS domain so as to receive service through an IMS domain, or shifts a UE receiving service through an IMS domain so as to receive service through a CS domain.

A call anchoring processing unit 908 places target address information of a received message with other address information, stores the substituted address information, stores information about a UE that has replaced the target address, and provides an inverse substitution service based on the stored information.

As described above, the present invention provides a detailed procedure and information formats which allows an MGCF taking charge of interworking between CSI and IMS service to convert and transfer capability information of a CSI-service capable UE and an IMS-service-only capable UE to the respective peer UEs. Thus, the IMS UE, as well as the CSI UE, can transmit its own capability information to a peer UE and acquire capability information of the peer UE so as to utilize the capability information in service.

In addition, according to the present invention, when a CSI-incapable UE, i.e., an IMS UE or VCC UE, transmits a call setup request to a CSI-capable UE, either a CSI AS or a CSI AS and a VCC AS adds capability information of the CSI-incapable UE to a SIP INVITE message and transfers the SIP INVITE message to the CSI UE, the CSI UE can use CSI using the capability information of the peer UE.

While the present invention has been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for transferring capability information of a calling-party User Equipment (UE) in combined Circuit-Switched (CS) and Internet Protocol Multimedia Subsystem (IMS) services (CSI), the method comprising:
   receiving, by a CSI Application Server (AS), a first Session Initiation Protocol (SIP) request message originating from the calling-party UE;
   generating, by the CSI AS, a second SIP message containing the capability information of the calling-party UE; and
   transmitting, by the CSI AS, the second SIP message containing the capability information of the calling-party UE to a called-party UE in a CS domain,
   wherein the capability information of the calling-party UE comprises i) information representing if the calling-party UE is capable of simultaneous CS and Packet-Switched (PS) services, ii) IMS state information representing if the calling-party UE is IMS registered, iii) version information representing if the capability information is updated, and iv) a personal Mobile Equipment (ME) identifier of the calling-party.

2. The method of claim 1, wherein the capability information of the calling-party UE is extracted from the first SIP request message.

3. The method of claim 1, wherein, in the generating step, the capability information of the calling-party UE is inserted into a SIP header of the second SIP message.

4. The method of claim 1, wherein, in the generating step, the capability information of the calling-party UE is inserted into a message body of the second SIP message in a predetermined format selected from an Extensible Markup Language (XML) format, a text format and a binary format.

5. The method of claim 1, further comprising:
   receiving, by a Media Gateway Control Function (MGCF), the second SIP message containing the capability information of the calling-party UE;
   converting the second SIP message into a CS message containing the capability information of the calling-party UE;
   transmitting, by the MGCF, the CS message containing the capability information of the calling-party UE to the called-party UE through the CS domain; and
   recognizing, by the called-party UE, through the capability information of the calling-party UE, that the called-party UE can achieve an IMS connection with the calling-party UE and is IMS registered, and storing the capability information.

6. The method of claim 1, further comprising:
   receiving, by the CSI AS, a SIP response message containing capability information of the called-party UE through a Media Gateway Control Function (MGCF) from the called-party UE;
   extracting, by the CSI AS, the capability information of the called-party UE contained in the SIP response message and storing the capability information of the called-party UE; and
   transmitting, by the CSI AS, the SIP response message to the calling-party UE.

7. The method of claim 6, further comprising:
   receiving, by the MGCF, a CS response message containing the capability information of the called-party UE from the called-party UE;
   converting, by the MGCF, the CS response message into the SIP response message containing the capability information of the called-party UE; and
   transmitting, by the MGCF, the SIP response message containing the capability information of the called-party UE to the CSI AS.

8. The method of claim 1, further comprising:
   receiving, by an MGCF of an originating-side network to which the calling-party UE belongs, a CS call request message initiated by the calling-party UE, through a CS domain to which the calling-party UE belongs;
   converting, by a Media Gateway Control Function (MGCF) of the originating-side network, the CS call request message into a third SIP message, and transferring the converted third SIP message to a Voice-Call-Continuity (VCC) AS which supports VCC service for the calling-party UE;

inserting, by the VCC AS, an indicator representing that the third SIP message requests a CS voice call through the CS domain, into the third SIP message to create the first SIP request message; and transmitting, by the VCC AS, the first SIP request message into which the indicator has been inserted to the CSI AS.

9. The method of claim 8, further comprising
identifying, by the CSI AS, that the first SIP request message contains the indicator which represents that the third SIP message requests the CS voice call, and determining to generate the second SIP message containing the capability information.

10. The method of claim 1, wherein the first SIP request message is a SIP INVITE message.

11. The method of claim 1, wherein the capability information of the called-party UE is acquired by querying from the CSI AS to a network entity which manages the capability information.

12. A system for transferring capability information of a calling-party User Equipment (UE) in combined Circuit-Switched (CS) and Internet Protocol Multimedia Subsystem (IMS) services (CSI), the system comprising:
a calling-party UE;
a called-party UE; and
a CSI Application Server (AS) for receiving a first Session Initiation Protocol (SIP) request message originating from the calling-party UE, generating a second SIP message containing the capability information of the calling-party UE, and transmitting the second SIP message containing the capability information of the calling-party UE to the called-party UE,
wherein the capability information of the calling-party UE comprises information representing if the calling-party UE is capable of simultaneous CS and Packet-Switched (PS) services, IMS state information representing if the calling-party UE is IMS registered, version information representing if the capability information is updated, and a personal Mobile Equipment (ME) identifier of the calling-party UE.

13. The system of claim 12, wherein the capability information of the calling-party UE is extracted from the first SIP request message.

14. The system of claim 12, wherein the CSI AS inserts a feature tag representing the capability information of the calling-party UE into a SIP header of the second SIP message.

15. The system of claim 12, wherein the CSI AS inserts the capability information of the calling-party UE into a message body of the second SIP message in a predetermined format selected from an Extensible Markup Language (XML) format, a text format and a binary format.

16. The system of claim 12, further comprising a Media Gateway Control Function (MGCF) for receiving the second SIP message containing the capability information of the calling-party UE converting the second SIP message into a CS message containing the capability information of the calling-party UE, and transmitting the CS message containing the capability information of the calling-party UE to the called-party UE through a CS domain to allow the called-party UE to recognize, through the capability information of the calling-party UE, that the called-party UE is IMS registered and can achieve an IMS connection with the calling-party UE, and stores the capability information of the calling-party UE.

17. The system of claim 12, wherein the CSI AS receives a SIP response message containing capability information of the called-party UE through the MGCF from the called-party UE, extracts the capability information of the called-party UE contained in the SIP response message, stores the capability of the called-party UE, and transmits the SIP response message to the calling-party UE.

18. The system of claim 17, wherein the MGCF receives a CS response message containing the capability information of the called-party UE from the called-party UE, converts the CS response message into the SIP response message containing the capability information of the called-party UE, and transmits the SIP response message containing the capability information of the called-party UE to the CSI AS.

19. The system of claim 12, further comprising an MGCF of an originating-side network to which the calling-party UE belongs,
wherein the MGCF receives a CS call request message initiated by the calling-party UE through a CS domain to which the calling-party UE belongs, converts the CS call request message into a third SIP message, and transfers the converted third SIP message to a Voice-Call-Continuity (VCC) AS which supports VCC service for the calling-party UE,
wherein the VCC AS inserts an indicator representing that the third SIP message requests a CS voice call through the CS domain into the third SIP message to create the first SIP request message, and transmits the first SIP request message into which the indicator has been inserted to the CSI AS.

20. The system of claim 19, wherein the CSI AS identifies that the first SIP request message contains the indicator, which represents that the third SIP message requests the CS voice call, and determines to generate the second SIP message containing the capability information.

21. The system of claim 12, wherein the first SIP message which is a SIP INVITE message.

22. The system of claim 12, wherein the capability information of the called-party UE is acquired by querying from the CSI AS to a network entity which manages the capability information.

23. A method for transferring capability information of a calling-party User Equipment (UE) in combined Circuit-Switched (CS) and Internet Protocol Multimedia Subsystem (IMS) services (CSI), the method comprising:
transmitting a CS call request message containing the capability information of a calling-party UE;
receiving, by a Media Gateway Control Function (MGCF), the CS call request message;
converting, by the MGCF, the CS call request message into a Session Initiation Protocol (SIP) message containing the capability information of the calling-party UE; and
transmitting, by the MGCF, the SIP message containing the capability information of the calling-party UE to a called-party UE,
wherein the capability information of the calling-party UE comprises information representing if the calling-party UE is capable of simultaneous CS and Packet-Switched (PS) services, IMS state information representing if the calling-party UE is IMS registered, version information representing if the capability information is updated, and a personal Mobile Equipment (ME) identifier of the calling-party UE.

24. The method of claim 23, further comprising:
receiving, by the MGCF, a SIP response message containing capability information of the called-party UE from the called-party UE in response to the first SIP message;
converting, by the MGCF, the SIP response message into a CS response message containing the capability information of the called-party UE;

transmitting, by the MGCF, the CS response message containing the capability information of the called-party UE to the calling-party UE through the CS domain; and extracting, by the calling-party UE, the capability information of the called-party UE from the CS response message, and storing the extracted capability information.

25. A method for transferring capability information of a called-party User Equipment (UE) in combined Circuit-Switched (CS) and Internet Protocol Multimedia Subsystem (IMS) services (CSI), the method comprising:

receiving, by a Media Gateway Control Function (MGCF), a CS response message containing capability information of the called-party UE from a CS domain of the called-party UE;

generating, by the MGCF, a Session Internet Protocol (SIP) response message containing the capability information of the called-party UE by interworking the capability information between an IMS domain and the CS domain; and transmitting, by the MGCF, the SIP response message containing the capability information of the called-party UE to a calling-party UE, wherein the capability information of the called-party UE comprises information representing if the called-party UE is capable of simultaneous CS and Packet-Switched (PS) services, IMS state information representing if the called-party UE is IMS registered, version information representing if the capability information is updated, and a personal Mobile Equipment (ME) identifier of the called-party UE.

26. The method of claim 25, wherein the capability information of the called-party UE is included in a User-User Signaling (UUS) field of the CS response message.

27. The method of claim 25, wherein the capability information of the called-party UE is included in a SIP header of the SIP response message, or included in a message body of the SIP response message in a predetermined format selected from an Extensible Markup Language (XML) format, a text format and a binary format.

28. The method of claim 25, further comprising:

receiving, by the MGCF, a SIP request message containing capability information of the calling-party UE;

generating, by the MGCF, a CS call request message containing the capability information of the calling-party UE by interworking the capability of the calling-party UE between the IMS domain and the CS domain; and transmitting, by the MGCF, the CS call request message containing the capability information of the calling-party UE to the called-party UE, prior to receiving the CS response message.

29. A system for transferring capability information of a User Equipment (UE) in combined Circuit-Switched (CS) and Internet Protocol Multimedia Subsystem (IMS) services (CSI), the system comprising:

a calling-party UE;

a called-party UE; and a Media Gateway Control Function (MGCF) for receiving a CS response message containing capability information of a called-party UE from a CS domain of the called-party UE, generating a Session Internet Protocol (SIP) response message containing the capability information of the called-party UE by interworking the capability information between an IMS domain and the CS domain, and transmitting the SIP response message containing the capability information of the called-party UE to the calling-party UE, wherein the capability information of the called-party UE comprises information representing if the called-party UE is capable of simultaneous CS and Packet-Switched (PS) services, IMS state information representing if the called-party UE is IMS registered, version information representing if the capability information is updated, and a personal Mobile Equipment (ME) identifier of the called-party UE.

30. The system of claim 29, wherein the capability information of the called-party UE is included in a User-User Signaling (UUS) field of the CS response message.

31. The system of claim 29, wherein the capability information of the called-party UE is included in a SIP header of the SIP response message, or included in a message body of the SIP response message in a predetermined format selected from an Extensible Markup Language (XML) format, a text format and a binary format.

32. The system of claim 29, wherein the MGCF receives a SIP request message containing capability information of the calling-party UE, generates a CS call request message containing the capability information of the calling-party UE by interworking the capability of the calling-party UE between the IMS domain and the CS domain, and transmits the CS call request message containing the capability information of the calling-party UE to the called-party UE, prior to receiving the CS response message.

* * * * *